US006965219B2

(12) United States Patent
Brooks et al.

(10) Patent No.: US 6,965,219 B2
(45) Date of Patent: Nov. 15, 2005

(54) METHOD AND APPARATUS FOR AUTO-INTERLEAVING SYNCHRONIZATION IN A MULTIPHASE SWITCHING POWER CONVERTER

(75) Inventors: Steven W. Brooks, Pomona, CA (US); Paul Pickle, San Clemente, CA (US)

(73) Assignee: Microsemi Corporation, Irvine, CA (US)

( * ) Notice: Subject to any disclaimer, the term of this patent is extended or adjusted under 35 U.S.C. 154(b) by 59 days.

(21) Appl. No.: 10/424,549

(22) Filed: Apr. 25, 2003

(65) Prior Publication Data

US 2004/0041543 A1 Mar. 4, 2004

Related U.S. Application Data

(60) Provisional application No. 60/392,930, filed on Jun. 28, 2002.

(51) Int. Cl.$^7$ ................................. G05F 1/40
(52) U.S. Cl. ................. 323/282; 323/290; 323/272
(58) Field of Search ............... 323/282, 283, 323/272, 285, 271, 224, 290, 288; 363/65, 66, 67, 70, 48, 72

(56) References Cited

U.S. PATENT DOCUMENTS

| | | |
|---|---|---|
| 4,194,147 A | 3/1980 | Payne et al. |
| 4,257,090 A | 3/1981 | Kröger et al. |
| 4,276,590 A | 6/1981 | Hansel et al. |
| 4,359,679 A | 11/1982 | Regan |
| 4,425,613 A | 1/1984 | Shelly |
| 4,618,779 A | 10/1986 | Wiscombe |
| 4,635,178 A | 1/1987 | Greenhalgh |
| 4,663,570 A | 5/1987 | Luchaco et al. |
| 4,698,738 A | 10/1987 | Miller et al. |
| 4,717,833 A | 1/1988 | Small |
| 4,724,374 A | 2/1988 | Beg |

(Continued)

*Primary Examiner*—Rajnikant B. Patel
(74) *Attorney, Agent, or Firm*—Knobbe, Martens, Olson & Bear, LLP

(57) ABSTRACT

A plurality of single-phase synchronizing converter automatically synchronize on a peer-to-peer basis. Each synchronizing converter is configured as a DC-to-DC converter. The synchronizing converters operate in parallel as a multiphase converter. A common bus between the synchronizing converters includes a sync line and a common phase control line. Proper phasing automatically occurs when power is applied, and the phasing changes automatically as converters are added or removed. When the system powers up, the converters arbitrate for phase position. The phasing positions are random, but the phasing is relatively symmetrical regardless of the number of phases. Preferably, a hot-swappable converter module can be plugged into any location of a parallel multiphase bus to produce a common output voltage. When an additional module is plugged in, the converters readjust their phases to maintain phase symmetry. Preferably, each module shares a substantially equal portion of the output load.

21 Claims, 33 Drawing Sheets

U.S. PATENT DOCUMENTS

| | | | |
|---|---|---|---|
| 4,729,086 A | 3/1988 | Lethellier | |
| 4,734,844 A | 3/1988 | Rhoads | |
| 4,825,144 A | 4/1989 | Alberkrack et al. | |
| 4,924,170 A | 5/1990 | Henze | |
| 5,027,264 A | 6/1991 | DeDoncker et al. | |
| 5,036,452 A | 7/1991 | Loftus | |
| 5,057,719 A | 10/1991 | Niedra | |
| 5,077,486 A | 12/1991 | Marson et al. | |
| 5,157,269 A | 10/1992 | Jordan et al. | |
| 5,164,890 A | 11/1992 | Nakagawa et al. | |
| 5,200,643 A | 4/1993 | Brown | |
| 5,266,838 A | 11/1993 | Gerner | |
| 5,285,148 A | 2/1994 | Uhlenhoff et al. | |
| 5,351,180 A | 9/1994 | Brennen et al. | |
| 5,428,523 A | 6/1995 | McDonnal | |
| 5,546,298 A | 8/1996 | Rohner | |
| 5,546,299 A | 8/1996 | Lenz | |
| 5,568,044 A | 10/1996 | Bittner | |
| 5,602,464 A | 2/1997 | Linkowsky et al. | |
| 5,724,237 A | 3/1998 | Hunter | |
| 5,751,150 A | 5/1998 | Rippel et al. | |
| 5,834,925 A | 11/1998 | Chesavage | |
| 5,847,554 A | 12/1998 | Wilcox et al. | |
| 5,875,104 A | 2/1999 | Prager | |
| 5,883,797 A | 3/1999 | Amaro et al. | |
| 5,903,138 A | 5/1999 | Hwang et al. | |
| 5,945,815 A | 8/1999 | Elliott | |
| 5,973,368 A | 10/1999 | Pearce et al. | |
| 5,973,485 A | 10/1999 | Kates et al. | |
| 6,144,194 A | 11/2000 | Varga | |
| 6,150,803 A | 11/2000 | Varga | |
| 6,166,528 A | 12/2000 | Rossetti et al. | |
| 6,215,290 B1 * | 4/2001 | Yang et al. | 323/282 |
| 6,262,566 B1 * | 7/2001 | Dinh | 323/282 |
| 6,278,263 B1 * | 8/2001 | Walters et al. | 323/272 |
| 6,285,571 B1 | 9/2001 | Brooks et al. | |
| 6,292,378 B1 | 9/2001 | Brooks et al. | |
| 6,307,356 B1 | 10/2001 | Dwelley | |
| 6,346,798 B1 * | 2/2002 | Passoni et al. | 323/272 |
| RE37,609 E * | 3/2002 | Bittner | 323/272 |
| 6,362,608 B1 | 3/2002 | Ashburn et al. | |
| 6,465,993 B1 | 10/2002 | Clarkin et al. | |

* cited by examiner

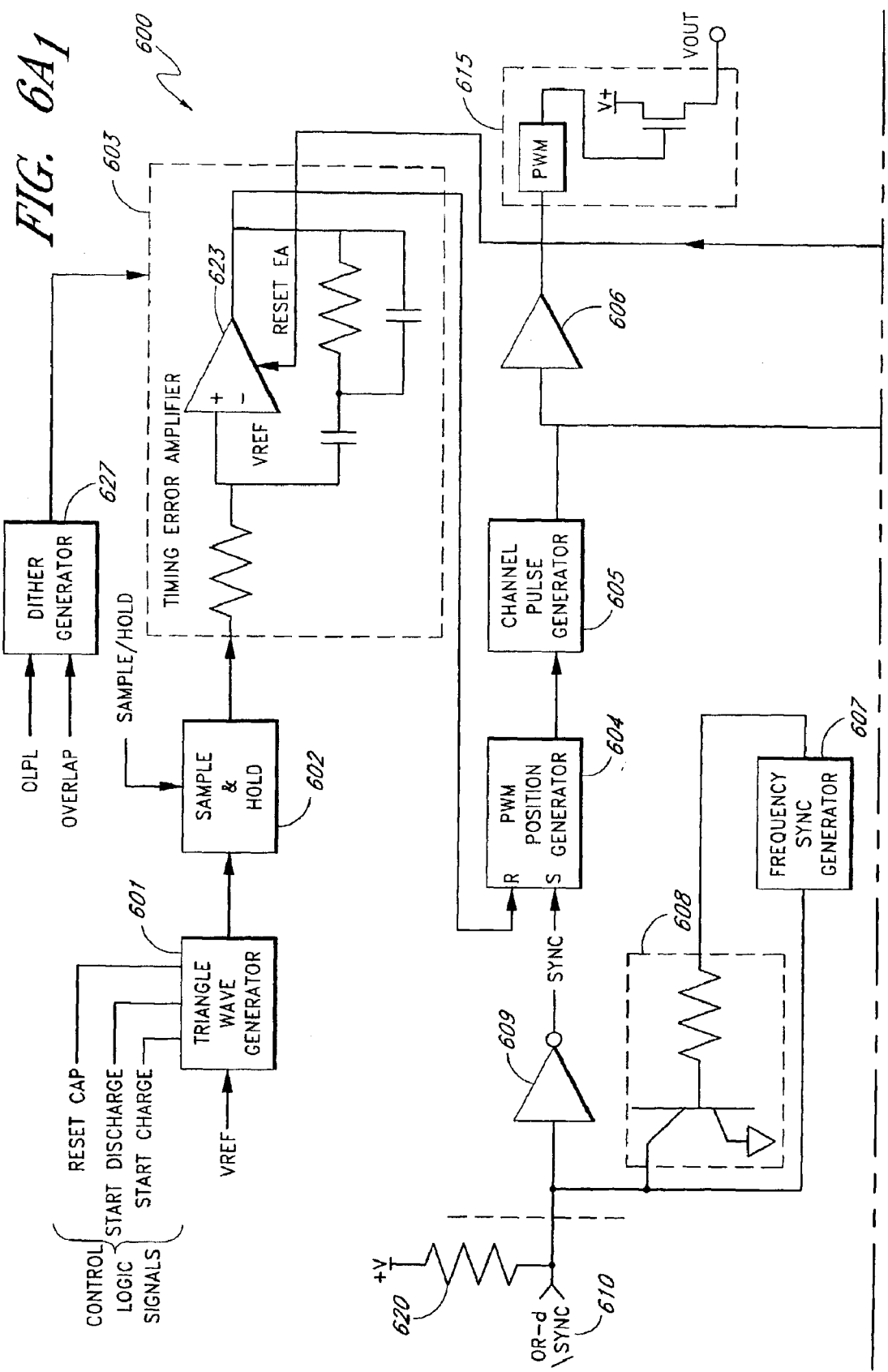
FIG. 6A1

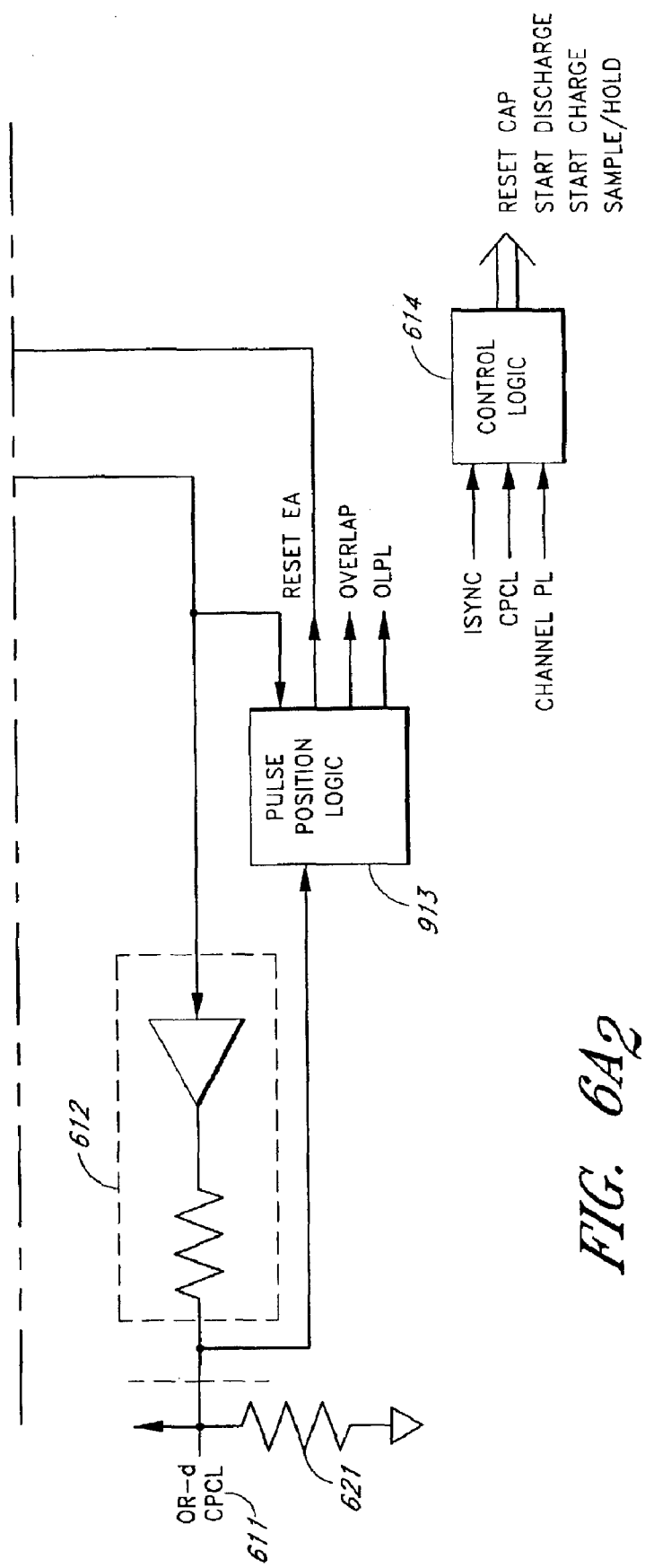
FIG. 6A2

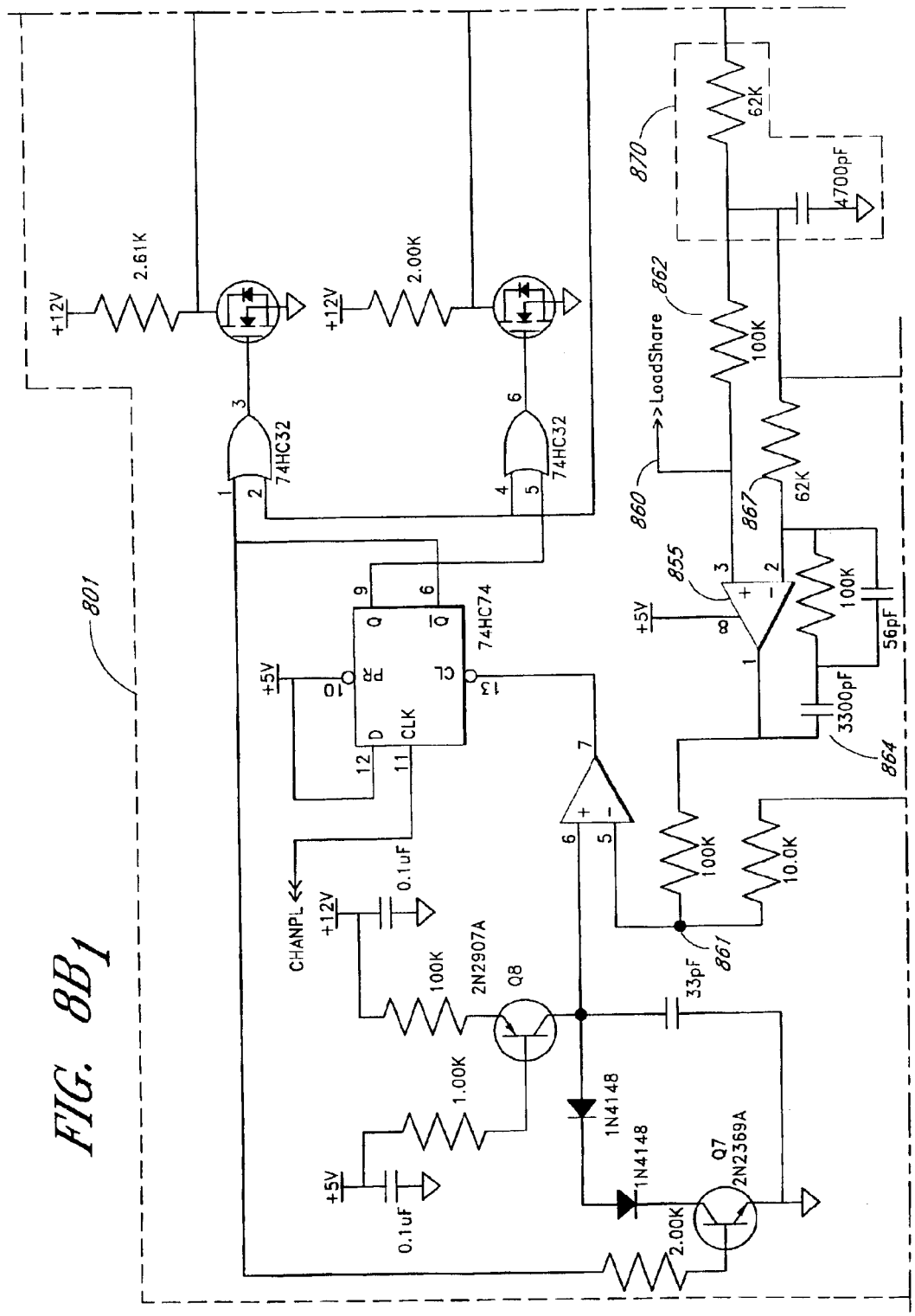
FIG. 8B1

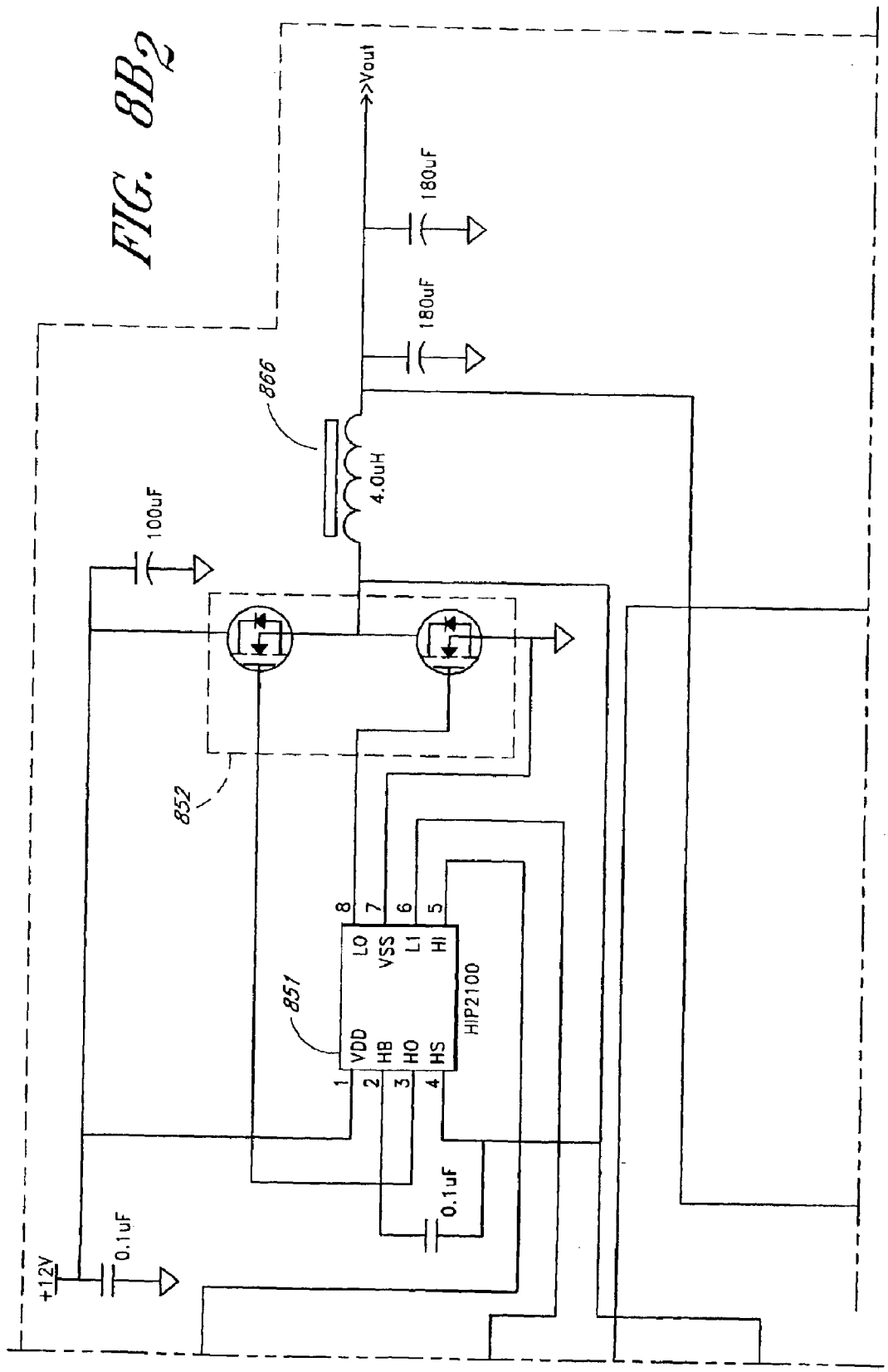
FIG. 8B2

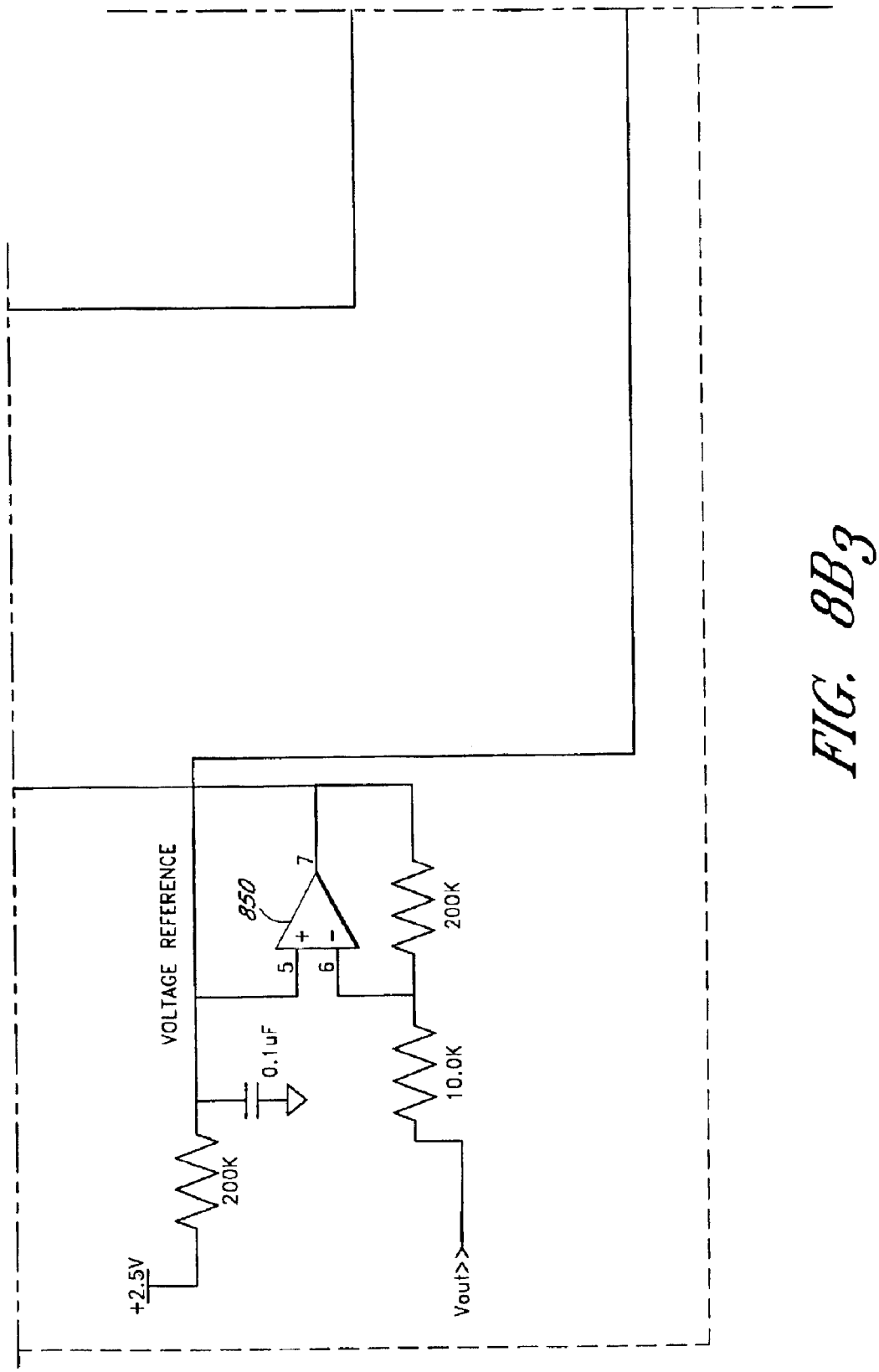
FIG. 8B₃

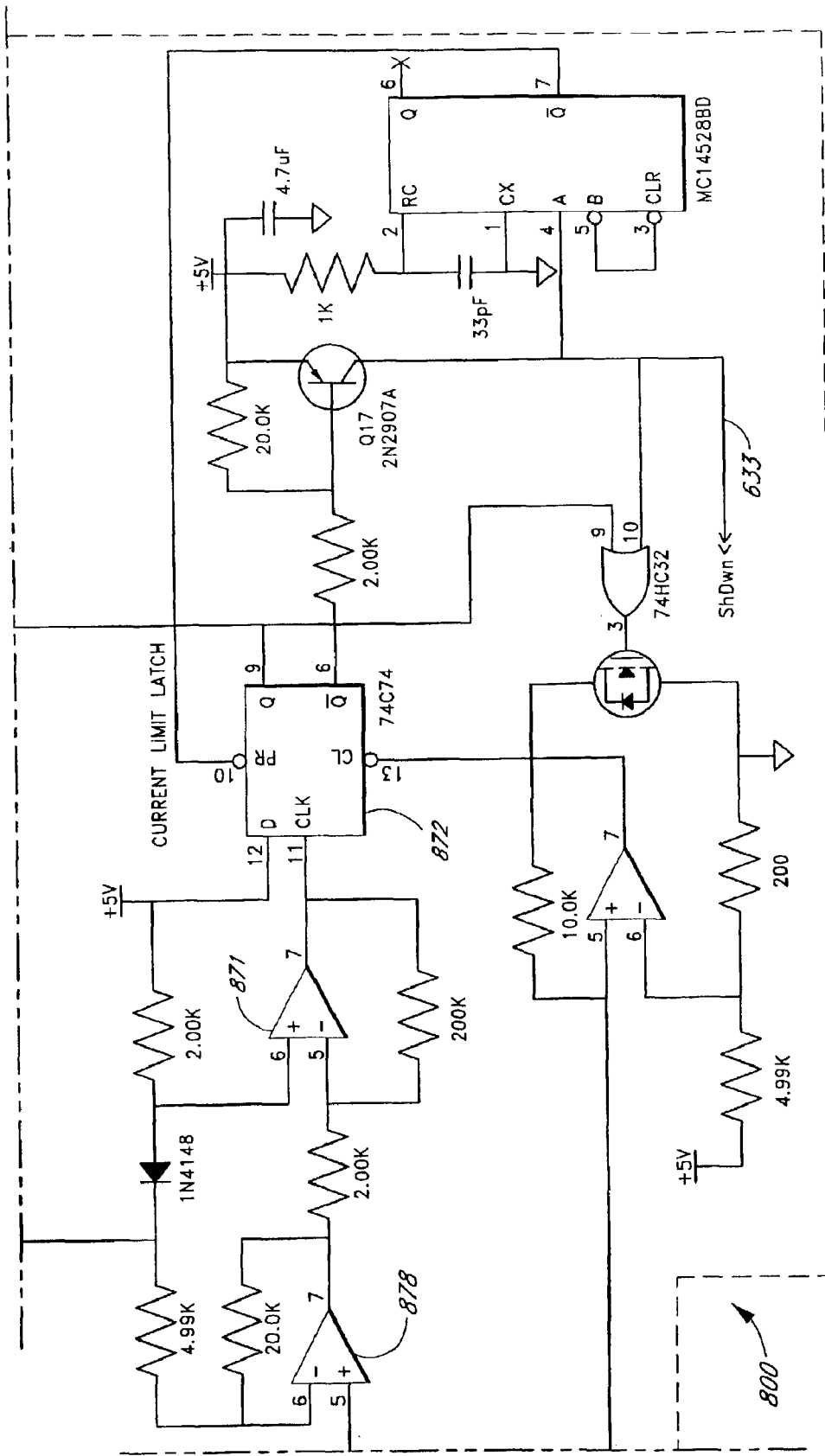
FIG. 8B4

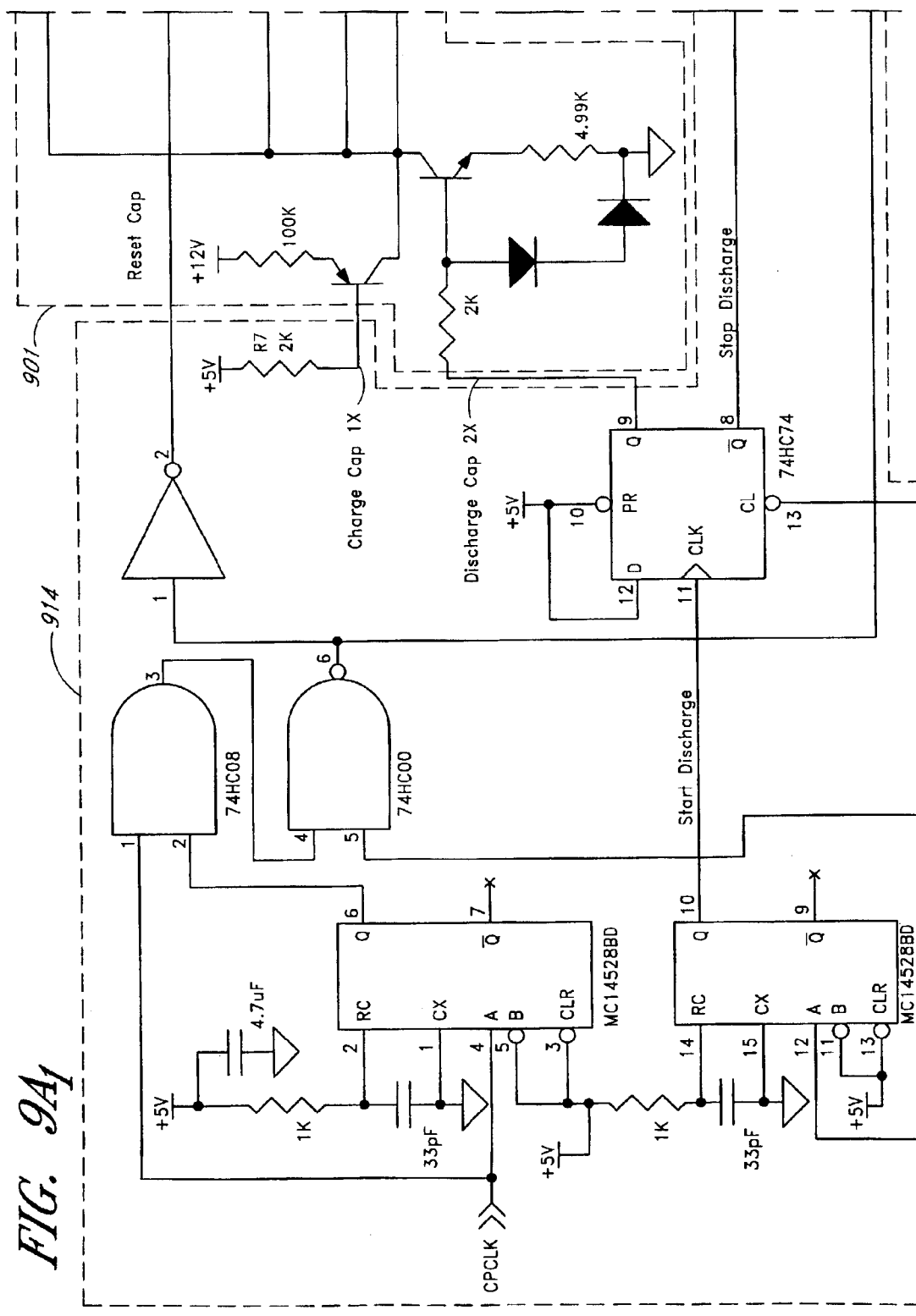
FIG. 9A₁

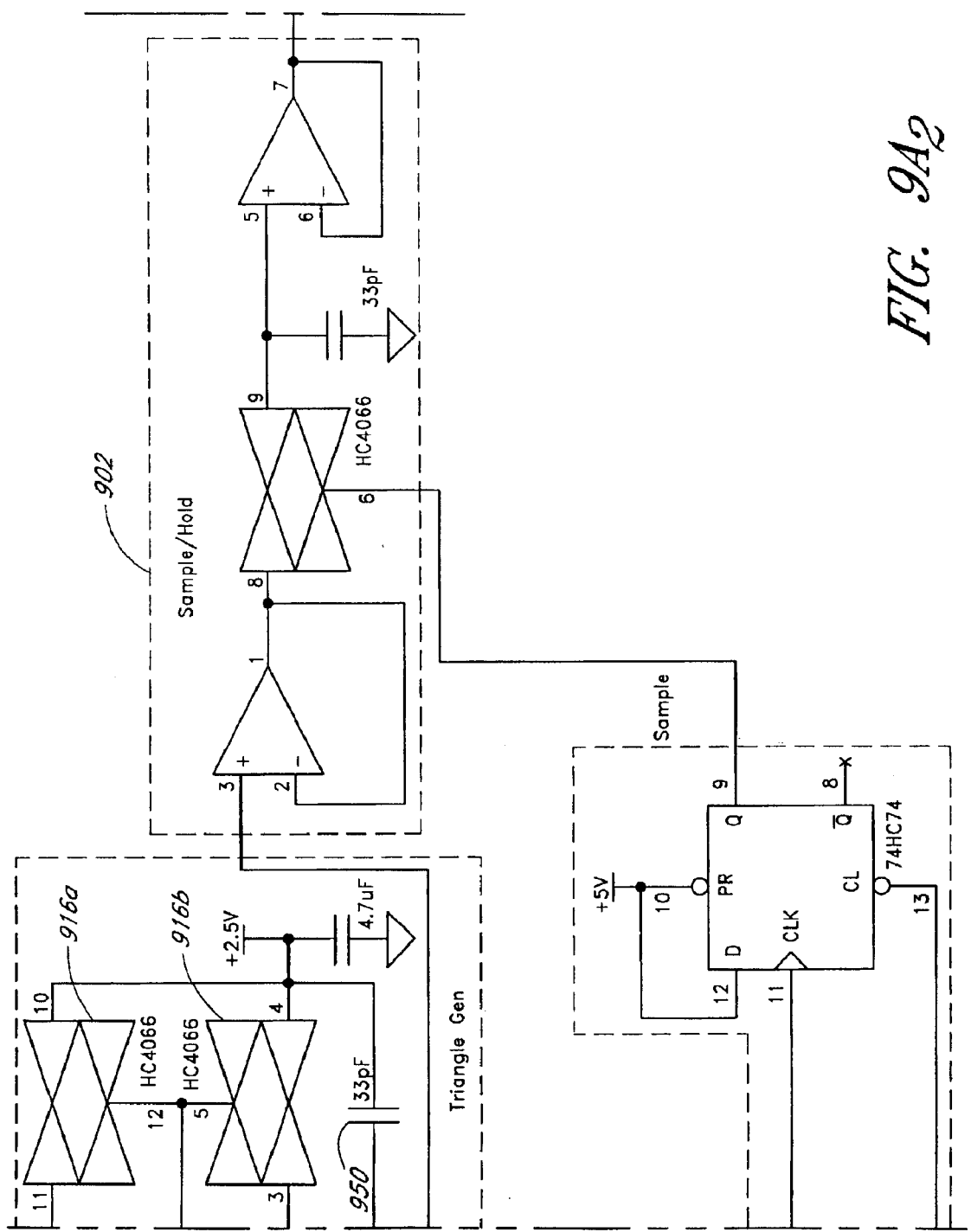
FIG. 9A2

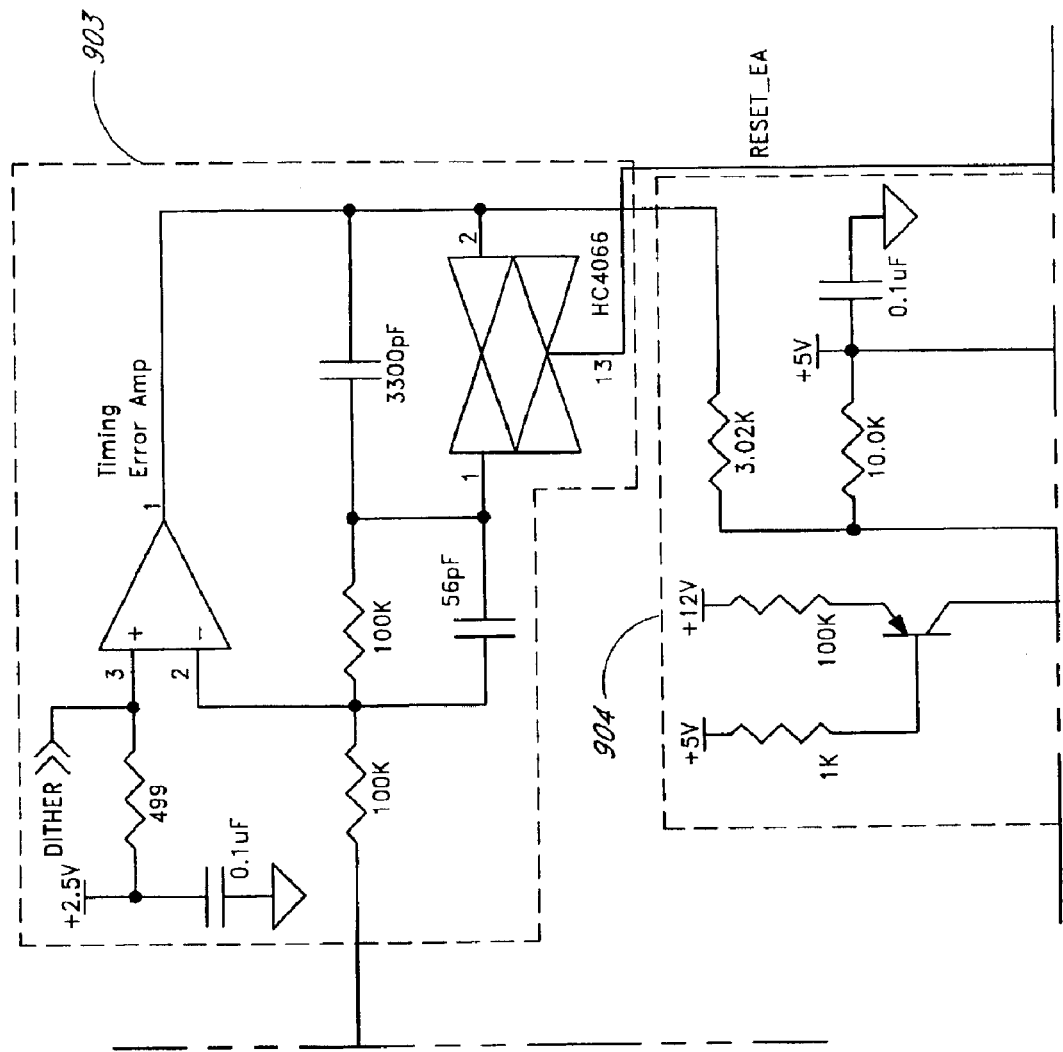
FIG. 9A3

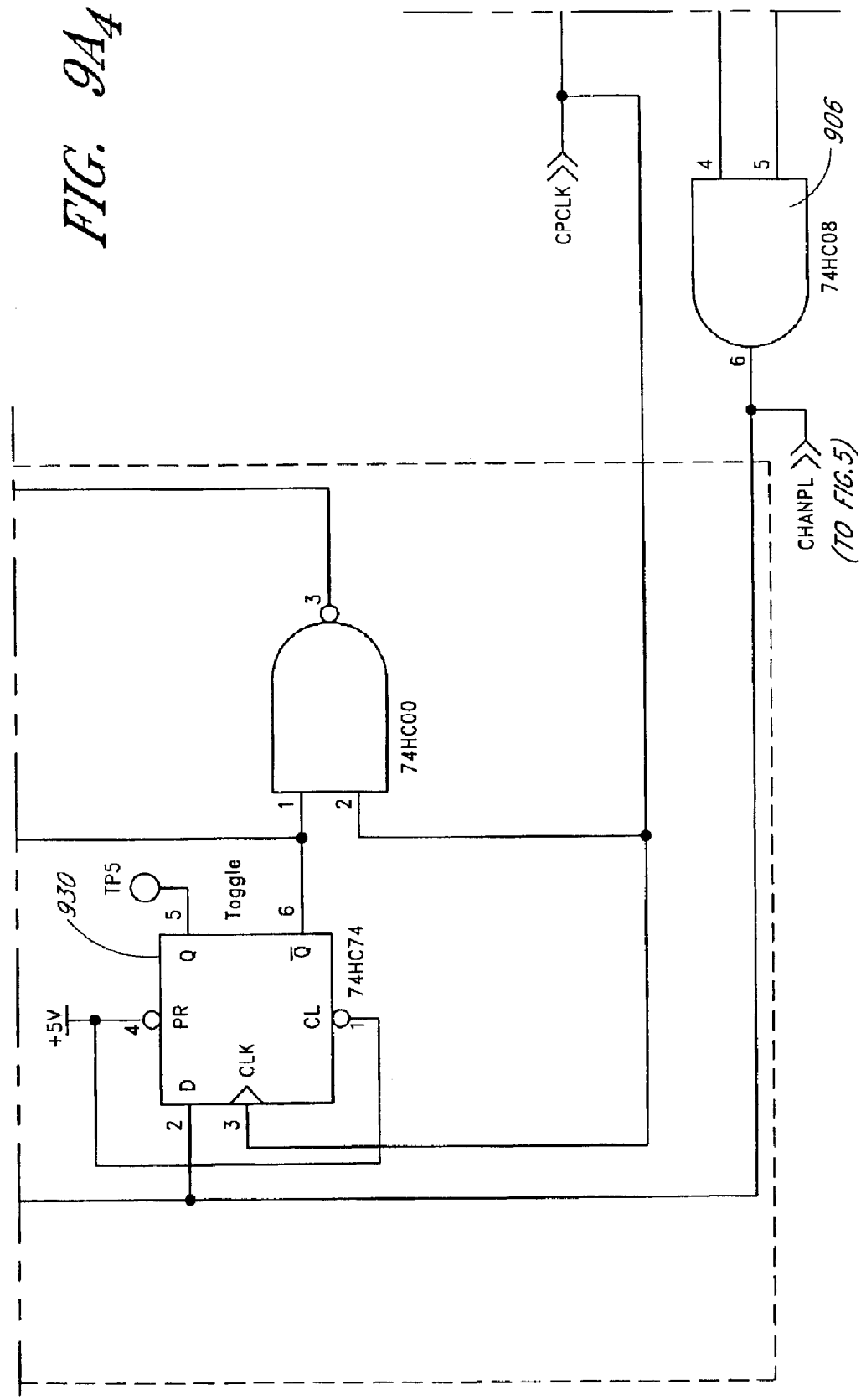
FIG. 9A₄

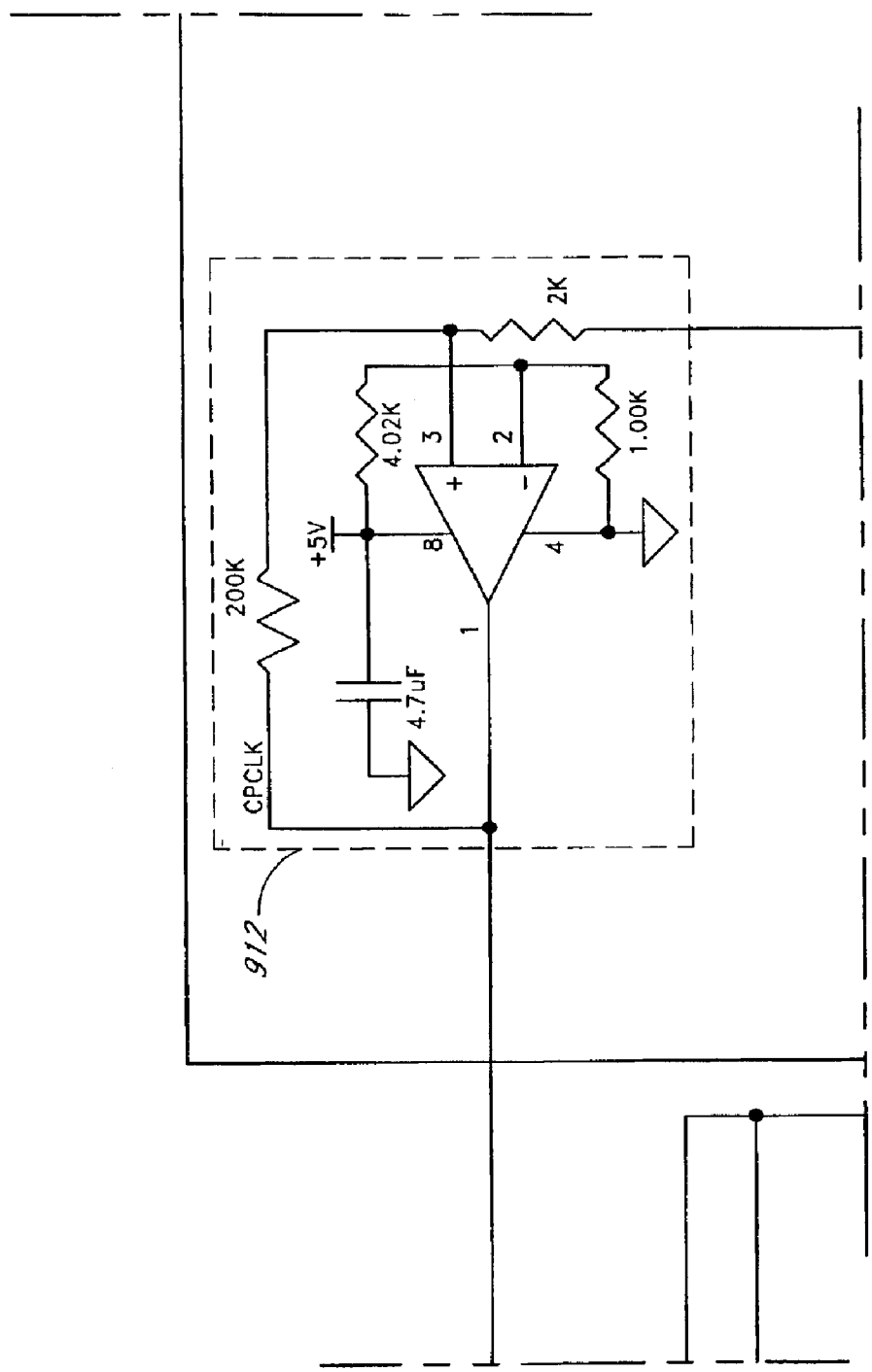
FIG. 9A5

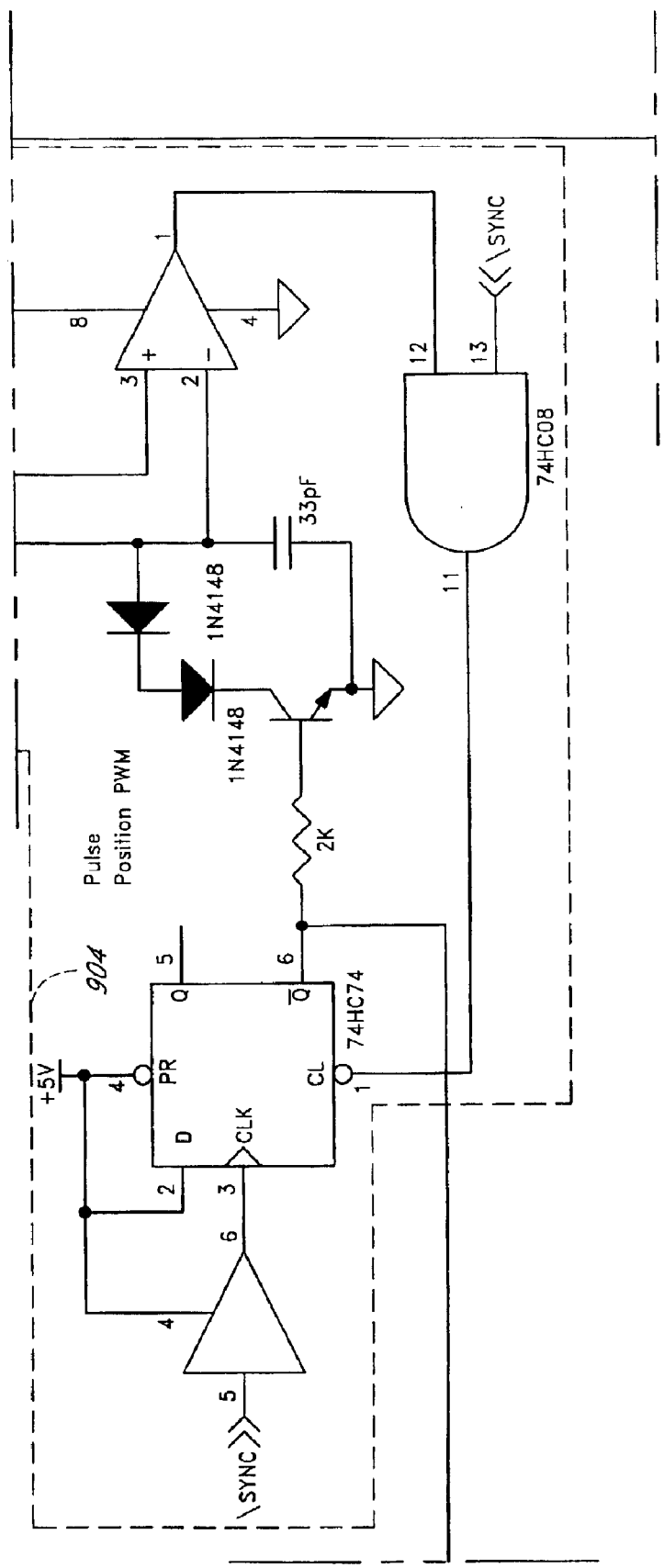
FIG. 9A6

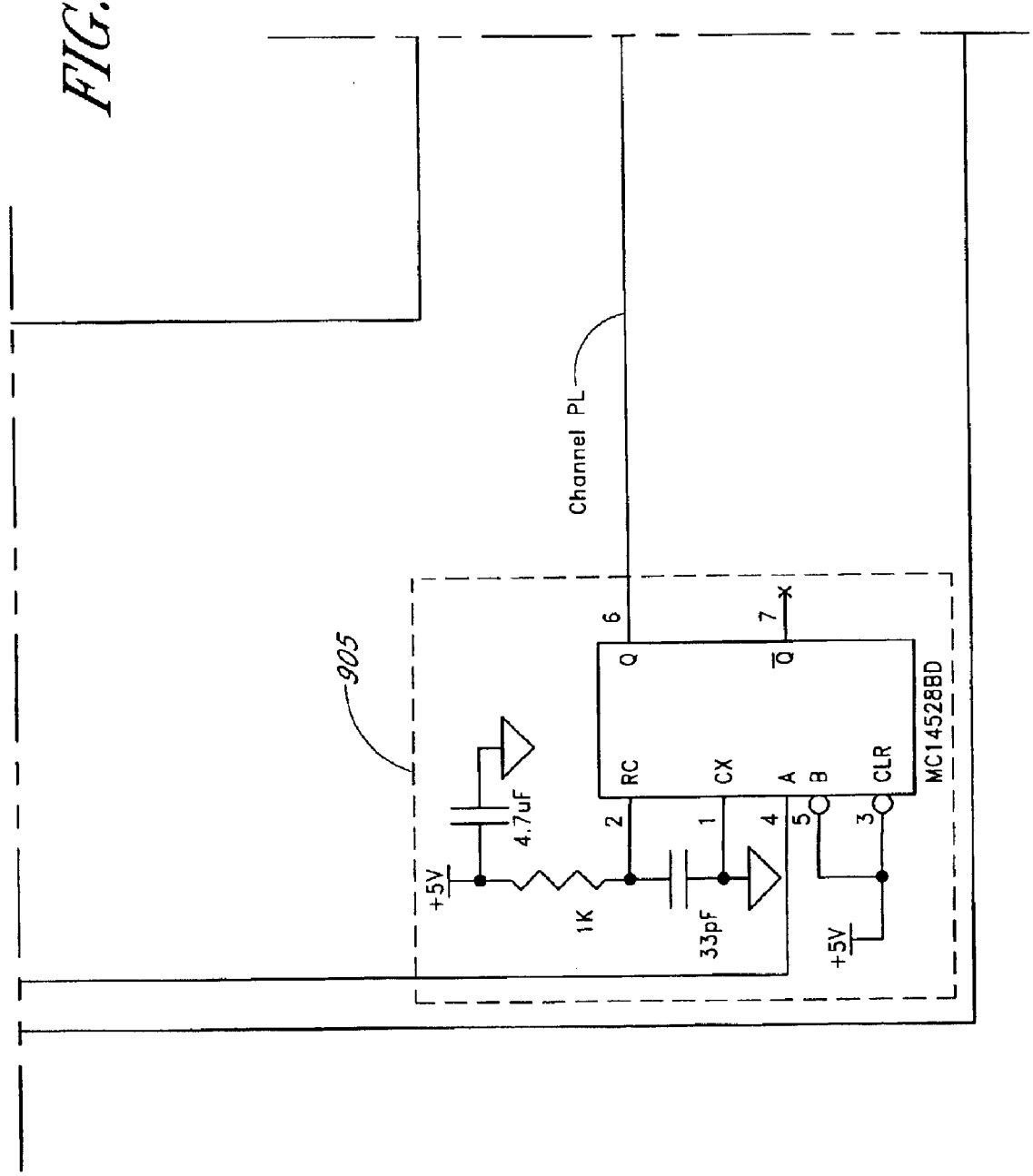
FIG. 9A7

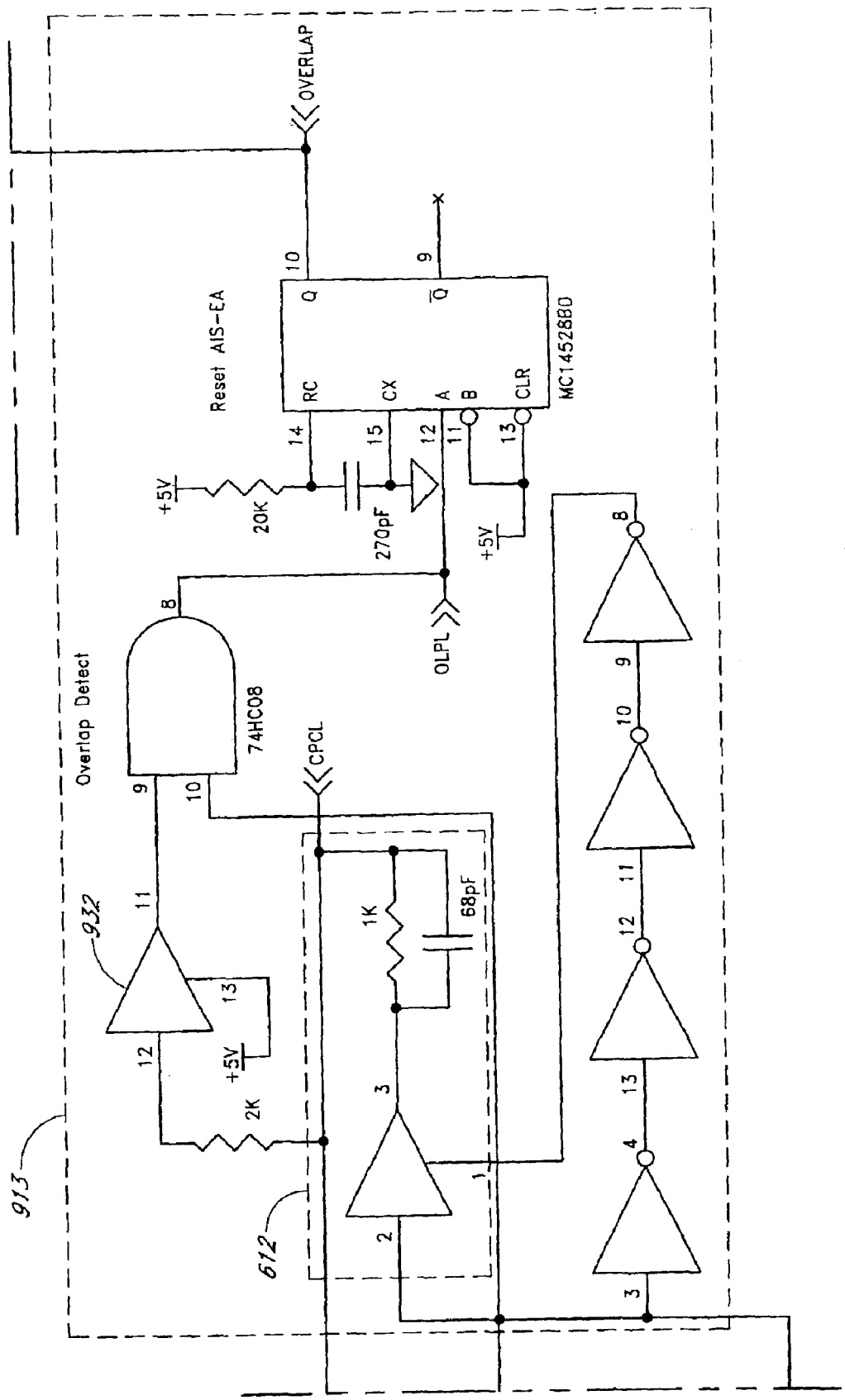
FIG. 9A8

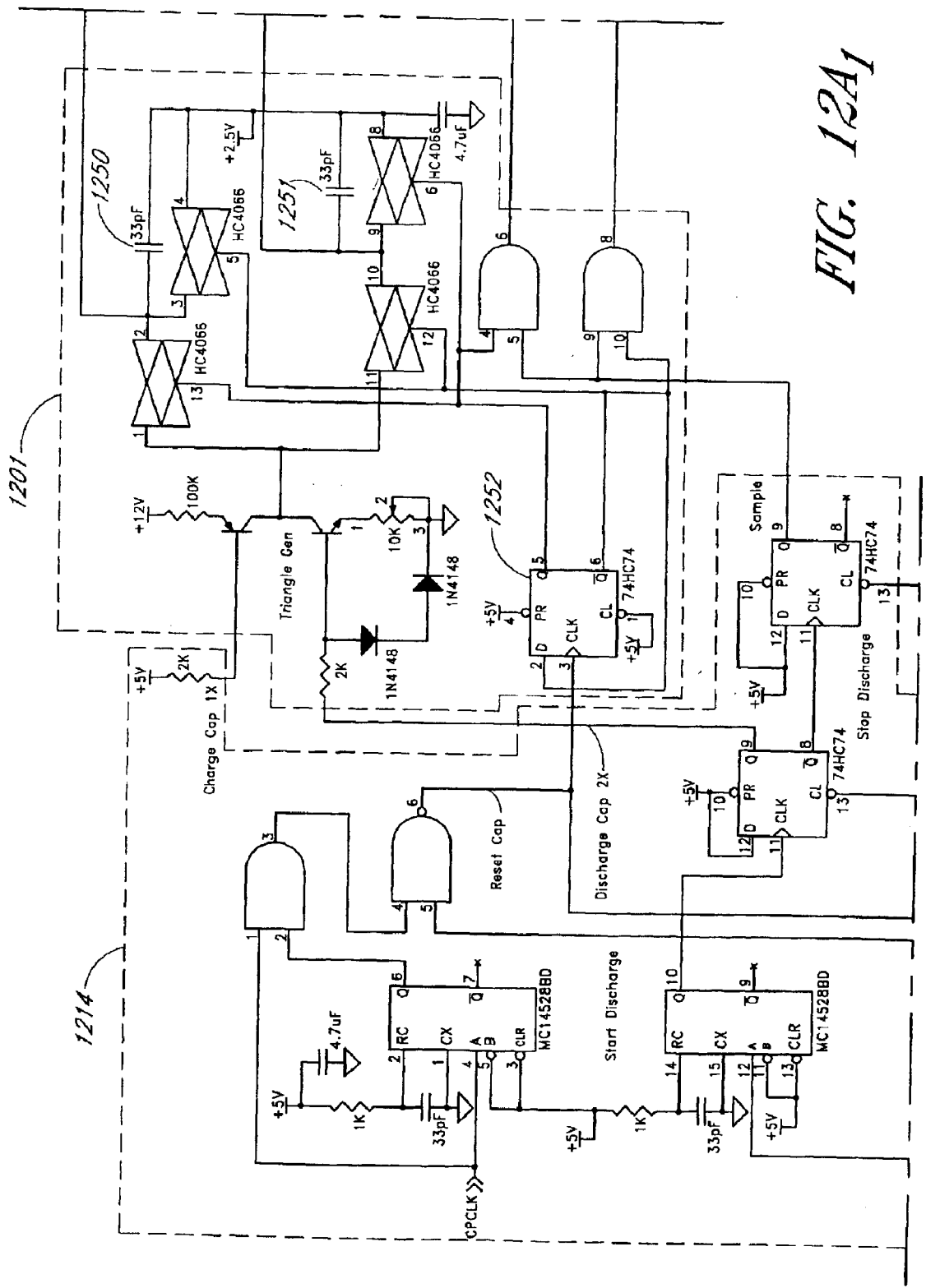
FIG. 12A₁

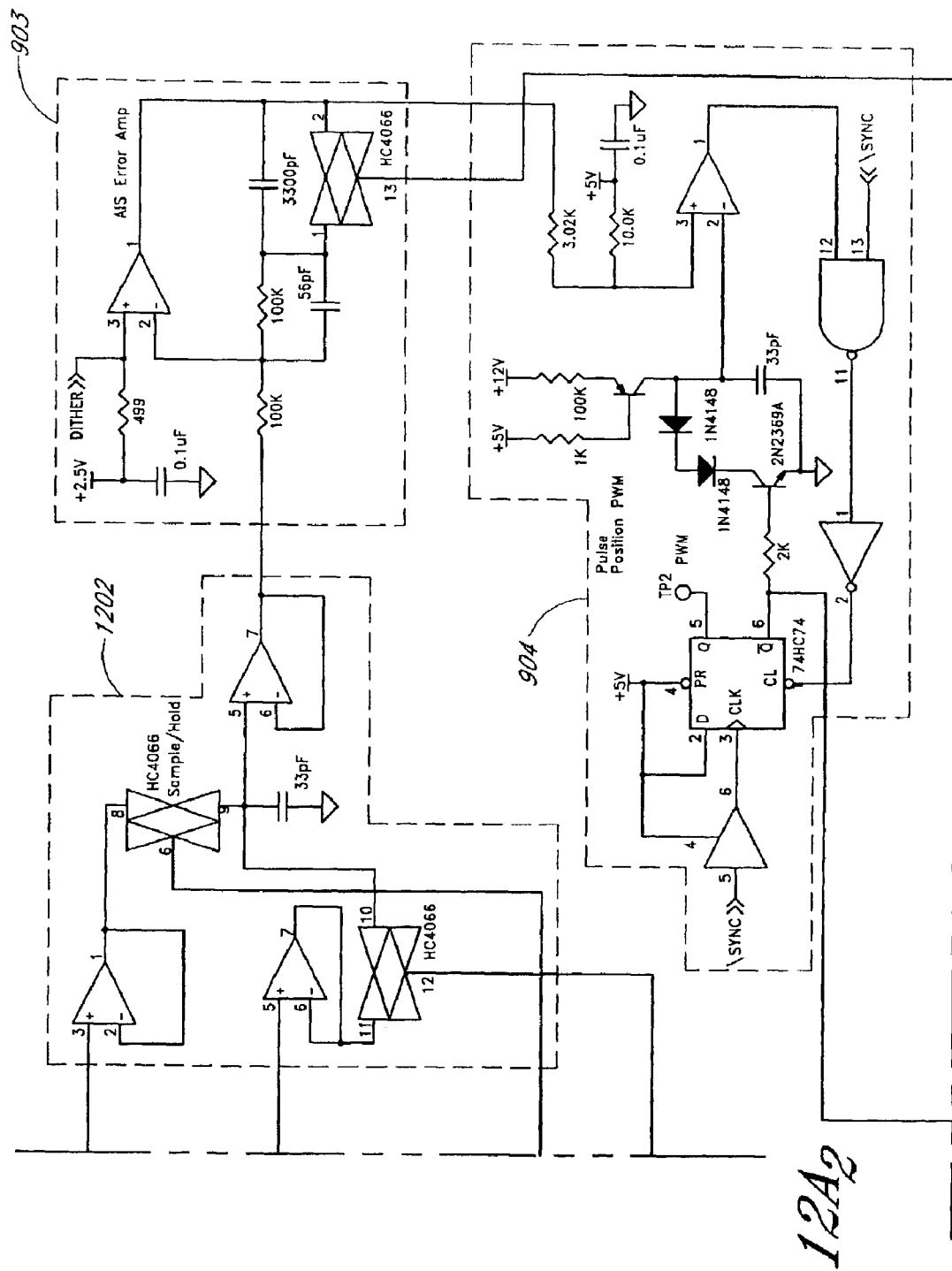
FIG. 12A2

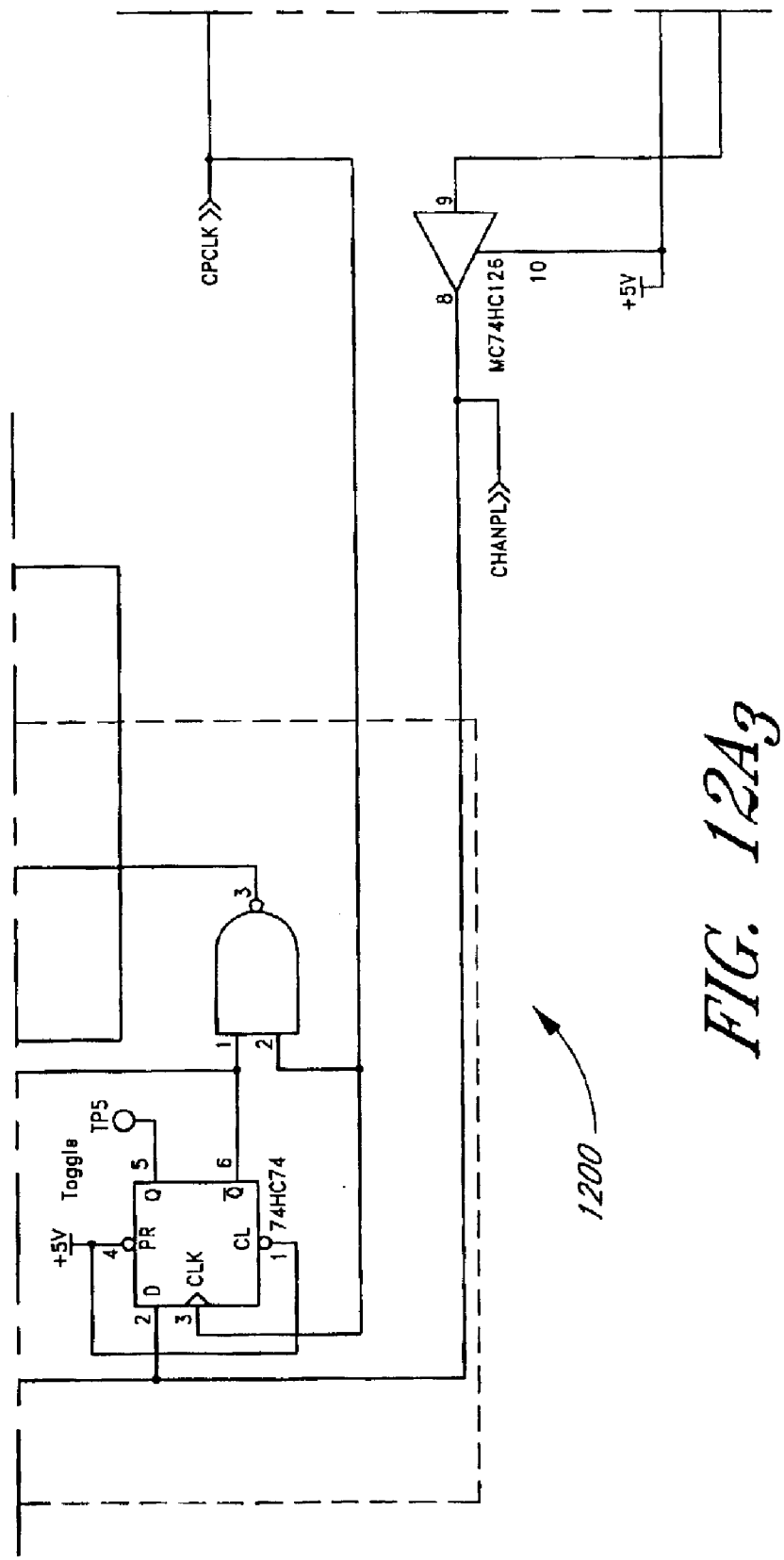
FIG. 12A3

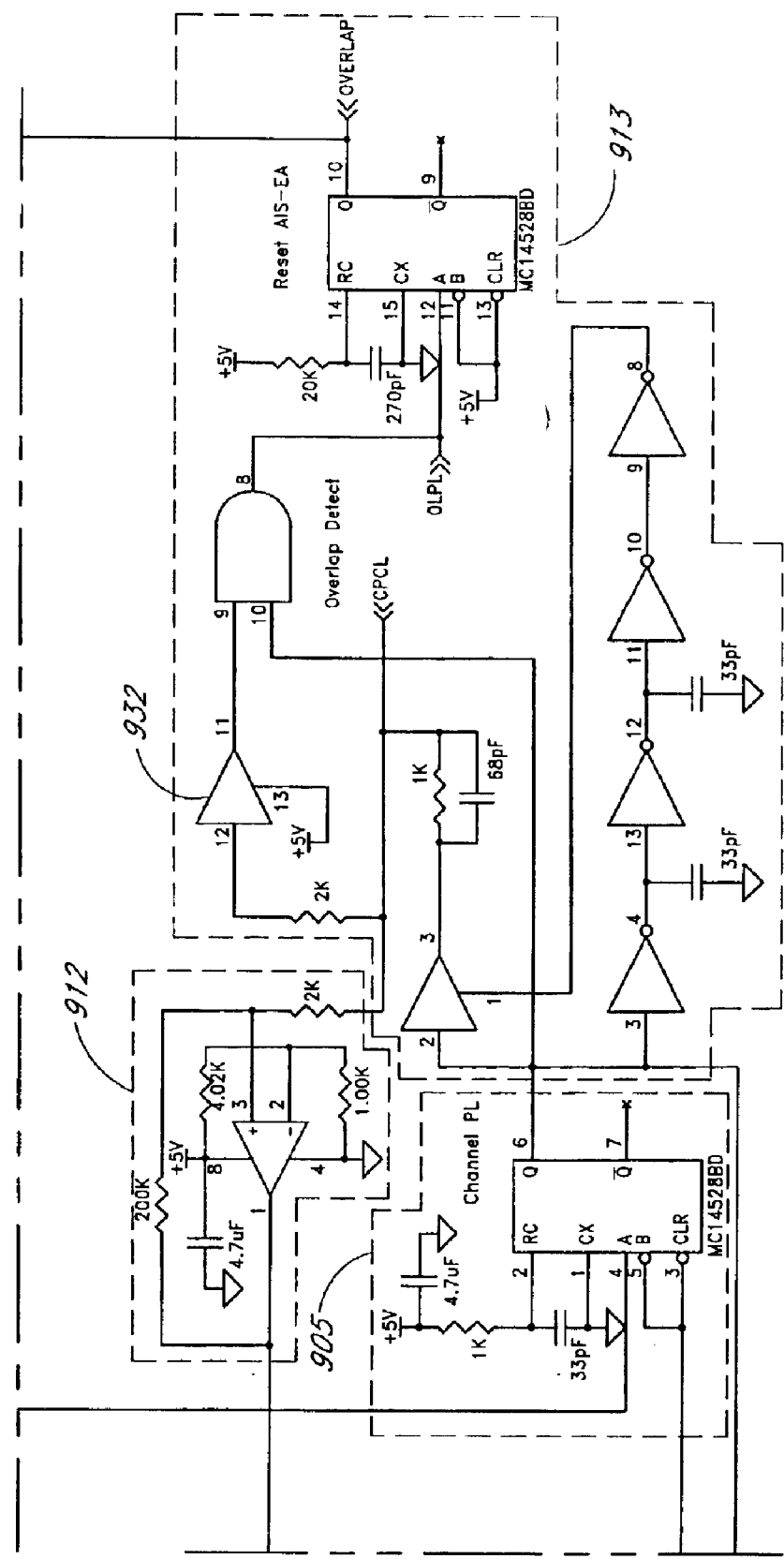
FIG. 12A4

METHOD AND APPARATUS FOR AUTO-INTERLEAVING SYNCHRONIZATION IN A MULTIPHASE SWITCHING POWER CONVERTER

RELATED APPLICATION

This application claims the benefit of priority under 35 U.S.C. § 119(e) from U.S. Provisional Patent Application No. 60/392,930 filed on Jun. 28, 2002, the entire contents of which is hereby incorporated by reference.

BACKGROUND OF THE INVENTION

1. Field of the Invention

This present invention relates generally to a power conversion circuit and more particularly to a multiphase switching power converter.

2. Description of the Related Art

A typical power conversion circuit (e.g., a switching power converter) receives an input voltage and an input current and modifies the input voltage, the input current or both the input voltage and the input current to produce an output voltage and an output current. For example, a DC-to-DC converter receives input power from a DC voltage source at one voltage level and outputs a desired DC output voltage (typically, a regulated DC output voltage) at another level. A converter that includes a feedback loop to regulate one or more output parameters (e.g., voltage, current, etc.) is often referred to as a regulator. One embodiment of a converter is a switching converter that uses one or more switches to alternately connect and disconnect the voltage source to circuits that drive the output. The duty cycle of the switching is used to control the output voltage. The switching is typically controlled by a Pulse-Width Modulation (PWM) circuit.

The advancement of the microprocessor integrated circuit into the gigahertz frequency band of operation has led to the use of DC-to-DC converters that can operate in the multiphase mode. State-of-the-art processors are now operating with a core voltage ranging from 1.4 volts to 1.8 volts and with a core current in the range of 30 to 75 amperes. The continuous inductor current rating sets a typical limitation in output current that can be delivered by a single-phase converter. At normal operating frequencies, this current typically ranges between 2 and 20 amperes. Under these assumptions, a processor core needing 60 amperes requires a converter with four or more phases.

In a multi-phase switching converter, a PWM circuit provides a variable duty cycle signal to control the switching for each channel. The PWM signals are synchronous with different phases for each channel, thereby allowing each channel to be switched on at a different time. The multiple phases increase the output ripple frequency above the fundamental channel switching frequency and reduce the input ripple current, thereby significantly reducing the sizes of input capacitors and output capacitors, which are often large and expensive. Stress and heat on the components are also reduced because the output current is distributed among the multiple channels.

The DC current through each inductor is responsive to the duty cycle of its PWM signal and to the value of its voltage source. Each inductor has a current limit. Typically, more PWM circuits are used when more output current is desired. The output terminals of all the inductors from the PWM circuits are electrically connected to provide a single output of the power conversion circuit.

Since the output terminals of all the inductors are tied together, the conductors have substantially identical output voltages. The input terminal of each inductor has a rectangular wave voltage signal, which is derived by switching the input terminal between the input voltage source and ground. The duty cycles of the rectangular wave voltage signals of respective channels are affected by variations in the respective PWM circuits and switches (e.g., design tolerances, offsets, and timing variations). For example, a slight difference in the duty cycle can produce a significant difference in the DC current through the inductor in each channel.

High efficiency power conversion circuits typically use inductors with low core loss (e.g., ferrite inductors). When the peak design current is exceeded (i.e., saturation), the inductance of ferrite core material collapses abruptly which results in an abrupt increase in inductor ripple current and output voltage ripple. Thus, it is important to keep the inductor core from saturating.

Forced current sharing is used to cause all the channels to contribute substantially identical currents to the output. Forced current sharing prevents an inductor in one of the channels from saturating. Prior art systems sense the current in each channel and adjust the respective duty cycles to produce the same current for each channel. Current sensing decreases the efficiency of the power conversion circuit because power is dissipated by a sensing resistor. Further, current sensing requires an undesirable ripple voltage across the sensing resistor in order to work properly. Other prior art systems employ costly precision design and trimming in an attempt to achieve accurate current sharing without sensing resistors. Typically, phase current mismatches are on the order of 30 percent or greater when employing precision duty cycle matched converters, necessitating the use of significantly higher current MOSFETs and inductors.

In a typical multiphase converter, the frequency of each phase is identical and the phase relationship between the various phases is adjusted to produce phase symmetry in the context of 0 to 360 degrees for one cycle. The typical phase relationship is 360 degrees divided by the number of phases used (e.g., in a two-phase converter, the phases are 180 degrees apart, in a three-phase converter the phases are 120 degrees apart, etc.). This phasing is useful because the input ripple current and the output ripple current typically have maximum reduction when the phases are added together symmetrically. As in the output current, the ripple current is reduced by half and the ripple frequency is twice that of the operating frequency when two phases are operated in parallel. Thus, smaller input filter capacitors and smaller output filter capacitors may be used for a given design.

Another feature of a multiphase converter is the improvement of the load transient response of the converter with each additional phase. Typically, a PWM operates at a frequency around 500 kHz. Some converter designs are approaching a 1 MHz operating frequency to improve transient response. Some transient specifications are approaching 60 amperes per microsecond transient response. From the position of the load, looking back into the DC-to-DC converter, a two-phase 500 kHz converter looks substantially the same as a single 1 MHz converter. Therefore, a four-phase 500 kHz converter has approximately the performance as 2 MHz converter. In general, more phases added symmetrically will have the benefits of increased load current, improved transient response, better distribution of the heat loss, less input ripple current, less output ripple current, and potentially improved reliability.

Multiphase converters require the desired phase relationship to be maintained between the various outputs of the converter. Some converter systems use a reference/slave arrangement where multiple pins are used between integrated circuits (ICs) to set up the multiphase solution. In a reference/slave arrangement, one IC is the reference and the remaining IC's are the slaves. Slave ICs are coded to be placed in the proper phase relationship to the reference. In most cases, the ICs need a clock that runs at 4 to 8 times the reference clock frequency. The ICs include counters and decoders to produce the proper phasing from the clock. One exemplary system uses phase-lock loops between ICs to configure a multi-phase solution. Such ICs are very complex, and several pins are required for each IC to enable the IC to define a phase relationship with respect to the other ICs.

SUMMARY OF THE INVENTION

The present invention solves the foregoing problems and other problems by providing a single-phase synchronizing converter that is configured to automatically synchronize with other single-phase synchronizing converters on a peer-to-peer basis. In one embodiment, the synchronizing converter is configured as a DC-to-DC converter. Two or more synchronizing converters are operated in parallel to produce a multi-phase converter. In one embodiment, a common bus between the synchronizing converters includes a sync line and an open-collector type output with a common pull-up resistor. Phasing is automatic, and the phasing changes automatically as converters are added or removed. This automatic phasing is referred to herein as auto-interleaving synchronization.

For example, using the synchronizing converter, a three-phase converter can be initially configured for an existing processor. The three-phase converter can be quickly changed to a four-phase converter by adding another phase. Each time the system is powered up, the various converters arbitrate among themselves for phase position. Thus, the phasing positions are random, but the phasing is symmetrical regardless of the number of phases. In one embodiment, a hot-swappable single-phase module can be plugged into any location of a parallel multiphase bus to produce a common output voltage. Each time an additional module is plugged in (while power is on) the modules adjust their respective phases for phase symmetry. In one embodiment, each module shares a substantially equal portion of the output load current.

In one embodiment of an auto-interleaving multiphase switching converter, sensed voltages are provided to control the output currents of respective channels. The sensed voltages are derived from respective voltage waveforms applied to inputs of respective inductors in respective channels. A respective PWM circuit controls a switch coupled to the input of each inductor. The PWM circuit causes the switch to alternately connect the input of the inductor to a voltage source and to ground. As a result, the voltage waveform at the input of each inductor is a rectangular wave voltage with an amplitude approximately equal to the magnitude of the voltage source and with a duty cycle controlled by the PWM circuit. The sensed voltage is proportional to an average value of the voltage waveform at the input of the inductor and can be derived by lowpass filtering the input of the inductor. The sensed voltage is a DC value of the voltage waveform at the input of the inductor.

In one embodiment of an auto-interleaving multiphase switching converter, the sensed voltages are used to achieve forced current sharing. The output currents of respective channels are adjusted to be substantially identical by adjusting the PWM circuits of respective channels accordingly to achieve substantially identical sensed voltages in all the channels.

In one embodiment of an auto-interleaving multiphase switching converter, the same voltage source is supplied to each channel of the multiphase switching voltage converter. The sensed voltage is an average of the duty cycles of the voltage waveform at the input of each inductor. The duty cycle of the input of an inductor is the same as the duty cycle of the PWM signal being applied to the switch. Identical sensed voltages indicate that the duty cycles of the voltage waveforms at the inputs of respective inductors are substantially identical. Identical duty cycles applied to identical inductors result in identical output currents.

In one embodiment of an auto-interleaving multiphase switching converter, two or more voltage sources are supplied to the multiphase switching voltage converter to drive a common output. For example, a +5 volts DC voltage and a +12 volts DC voltage can supply current to a common load. The different voltage sources are processed by different channels of the multiphase switching voltage converter. Each voltage source is coupled to a different inductor input. The outputs of the inductors are electrically connected together to provide the common output.

Identical sensed voltages achieve forced current sharing between two or more voltage sources. In the case of two or more voltage sources, identical sensed voltages do not necessarily indicate identical duty cycles for the voltage waveforms at the inputs of respective inductors. The sensed voltage is also proportional to the value of the voltage source. For example, the duty cycle for the channel with the +12 volts DC voltage source is less than the duty cycle for the channel with the +5 volts DC voltage source when the respective sensed voltages are substantially identical. The sensed voltages represent the average voltages at the inputs of the respective inductors. Again, substantially identical inductors with substantially identical average voltages result in substantially identical output currents.

The auto-interleaving multiphase switching converter establishes forced current sharing by comparing the average sensed voltages to a reference voltage. The output voltage of the commonly-connected inductors is used as the reference voltage for all of the channels. Offset voltages are produced based on the differences between the respective sensed voltages and the reference voltage. The respective offset voltage is added to the output of a feedback amplifier to generate a control voltage which is used to adjust the duty cycle of the PWM signal being applied to the respective switches coupled to the input of the inductor. The use of the offset voltages forces the sensed voltages of respective channels to track the reference voltage.

The duty cycle ratios determine the output voltage level based on the level of the input voltage. The output voltage level is controlled through a feedback voltage, which is proportional to the output voltage of the multiphase switching converter. An error amplifier compares the feedback voltage to a reference voltage. A change in the feedback voltage indicates that a change in the total output current is desired to keep the output voltage level constant for a different load. The change is distributed evenly among the channels by changing the duty cycle ratios of all the channels in response to variations in the feedback voltage.

The sensed voltages of the present invention are advantageously derived at the input of the inductors. Compensation for variations of parameters in the PWM circuits, switches, and other control circuits in the multiphase switching converter is automatic to assure accurate current sharing. For example, the switches are typically implemented by MOSFETs. The ON resistances of the MOSFETs can vary by 30 to 40 percent, thereby varying the voltage waveforms applied to respective inductors. The variations appear in the sensed voltages and are compensated accordingly.

Accurate current sharing ensures that heat and component stresses are evenly distributed in the power conversion circuit, thereby improving reliability. Embodiments in accordance with the present invention achieve accurate current sharing among multiple channels of a switching converter without directly sensing the currents of respective channels, thereby reducing cost and power loss associated with sensing resistors typically used to sense current.

In one embodiment, an overlap detection circuit detects an overlap between output pulses produced by two synchronizing converters. In one embodiment, when an overlap is detected, a random phase shift is introduced to shift the phase of one or both of the overlapped channels to move their phase positions by different amounts and/or different directions. In one embodiment, the phase of the overlapped channels are shifted in different directions, by different amounts, or both. In one embodiment, a control circuit dithers (e.g., increases or decreases) a reference voltage setting for each overlapped channel by ±x millivolts. In one embodiment, the amount of change is advantageously chosen to be sufficient to move the channel pulse by more than one pulse width when the integrating capacitor in the feedback of an integrating error amplifier is shorted out.

BRIEF DESCRIPTION OF THE DRAWINGS

Embodiments of the present invention are described herein with reference to the accompanying drawings in which:

FIG. 6A (consisting of FIGS. 6A1–6A2) is a block diagram of the auto-interleaved synchronizing module;

DETAILED DESCRIPTION OF THE PREFERRED EMBODIMENTS

Figure 1:
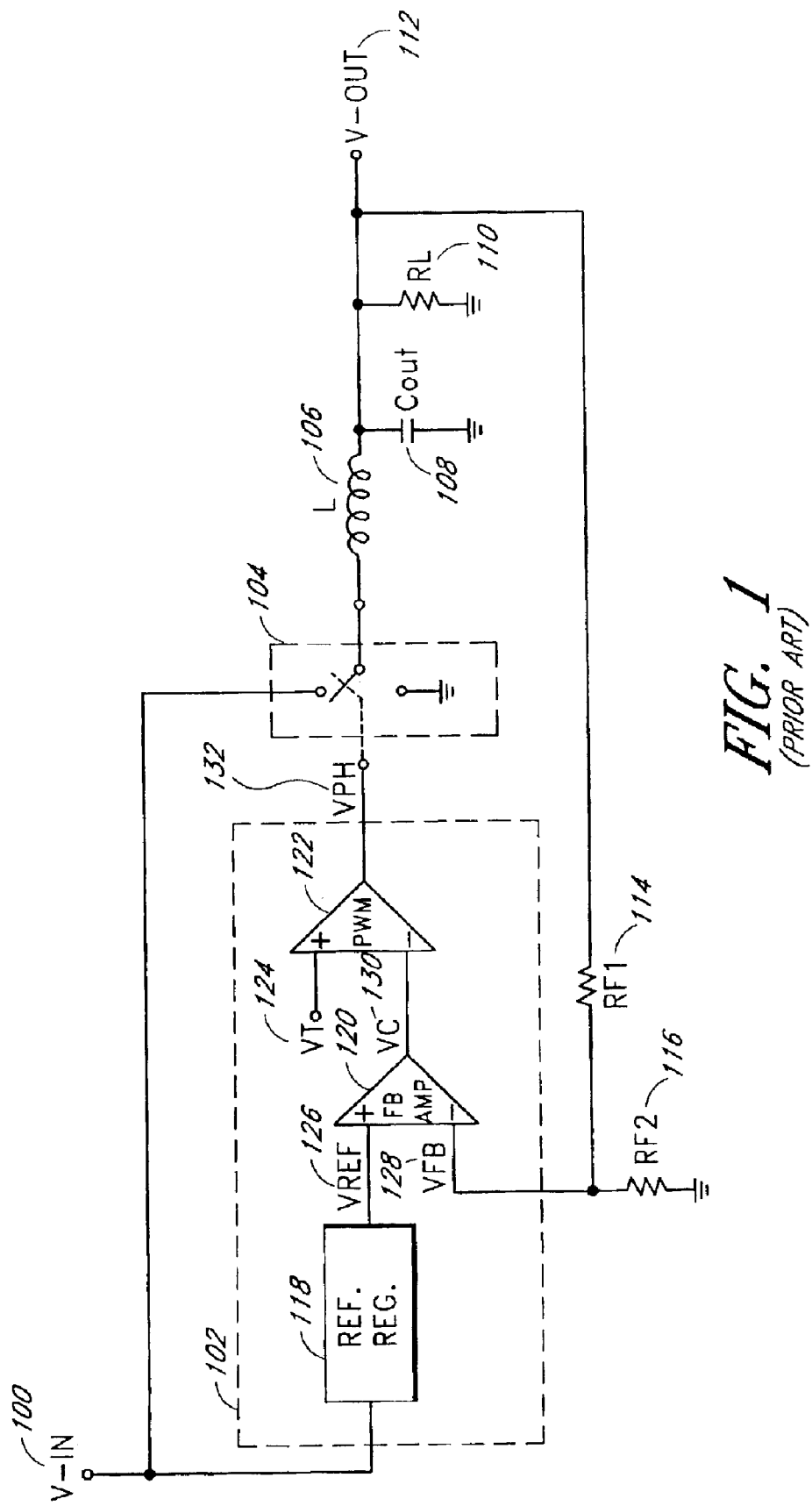
FIG. 1 is a schematic diagram of a switching converter;.

FIG. 1 is a schematic diagram of a typical switching converter. A voltage source (V-IN) 100 is provided to a controller 102 and to a switch 104 to establish an output voltage (V-OUT) 112. The controller 102 includes a reference regulator (REF. REG.) 118, a feedback amplifier (FB AMP) 120 and a PWM circuit 122.

The reference regulator 118 accepts an input from the voltage source 100 and generates a reference voltage (VREF) 126. The feedback amplifier 120 compares the reference voltage 126 with a feedback voltage (VFB) 128 and generates a control voltage (VC) 130. The PWM circuit 122 generates a rectangular wave voltage (VPH) 132 based on the control voltage 130 and a triangular wave voltage (VT) 124.

The rectangular wave voltage 132 controls the operation of the switch 104 which alternately connects the input terminal of an inductor 106 to the voltage source 100 and to ground. The output terminal of the inductor 106 is coupled to the output voltage 112. An output capacitor (Cout) 108 is connected between the output voltage 112 and ground. A resistor (RL) 110, representative of an output load, is also connected between the output voltage 112 and ground. The output voltage 112 is provided to a resistor (RF1) 114. The resistor 114 is connected to a resistor (RF2) 116 in a resistor-divider configuration. The voltage across the resistor 116 is the feedback voltage 128.

The switching converter is typically used in high output current applications because of its efficient architecture. Minimal power is dissipated by the switching converter because the output current encounters relatively lossless elements, such as the inductor 106 and the output capacitor 108 in the switching converter. Some power is dissipated by the reference converter 118 that provides the reference voltage 126, and some power is dissipated by the other circuits in the switching converter. However, the magnitude of the current required by the reference converter 118 and the other circuits is typically much less than the output current so the overall efficiency is not affected.

The feedback amplifier 120 generates the control voltage 130 based on the difference between the reference voltage 126 and the feedback voltage 128. The reference voltage 126 is fixed. The feedback voltage 128 is proportional to the output voltage 112. When the output voltage 112 increases, the feedback voltage 128 increases, and the control voltage 130 consequently decreases. When the output voltage 112 decreases, the feedback voltage 128 decreases, and the control voltage 130 consequently increases.

The control voltage 130 determines the duty cycle of the rectangular wave voltage 132 at the output of the PWM circuit 122. The rectangular wave voltage 132 is generated by comparing the control voltage 130 with the triangular wave voltage 124. The rectangular wave voltage 132 switches state when the triangular wave voltage 124 crosses the control voltage 130. The triangular wave voltage 124 has a fixed amplitude and frequency. By varying the control voltage 130, the state transitions of the rectangular wave voltage 132 vary, thus varying the duty cycle of the rectangular wave voltage 132.

The rectangular wave voltage 132 controls the switch 104. For example, when the rectangular wave voltage 132 is in a high state, the switch 104 is connected to ground. When the rectangular wave voltage 132 is in a low state, the switch 104 is connected to the voltage source 100. The voltage waveform applied to the inductor 106 alternates between the magnitude of the voltage source 100 and ground with the same duty cycle as the rectangular wave voltage 132. The combination of the inductor 106 and the output capacitor 108 acts as a lowpass filter that provides a substantially constant output voltage 112. The level of the output voltage 112 is the average value of the voltage waveform applied to the inductor 106. Thus, the output voltage 112 varies linearly with the duty cycle.

Figure 2:
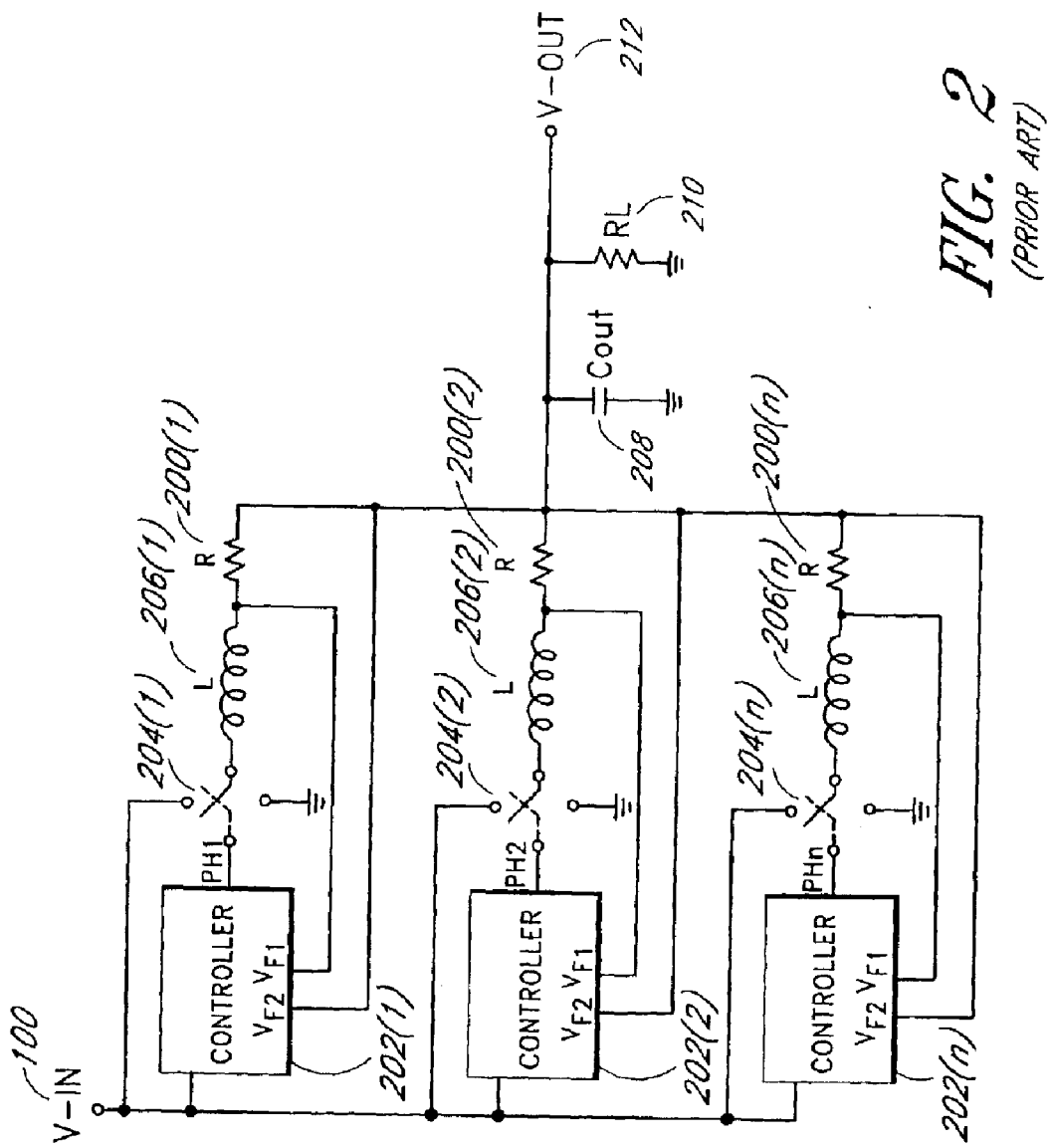
FIG. 2 is a schematic diagram of a multiphase switching converter.

FIG. 2 is a schematic diagram of a multi-phase switching converter that uses n substantially identical channels to process the voltage source 100 in parallel (each channel producing one phase of the multi-phase system). The voltage source 100 is provided to n switches shown as switches 204(1)–204(n)(collectively the switches 204) and to n controllers shown as controllers 202(1)–202(n)(collectively the controllers 202). The controllers 202 control the respective switches 204. The switches 204 alternately connect the input terminals of n respective inductors shown as inductors 206(1)–206(n)(collectively the inductors 206) to the voltage source 100 and to ground. The output terminals of the respective inductors 206 are connected to the input terminals of n respective sense resistors shown as sense resistors 200(1)–200(n)(collectively the sense resistors 200). The output terminals of the sense resistors 200 are commonly connected to provide an output voltage (V-OUT) 212. An output capacitor (Cout) 208 is connected between the output voltage 212 and ground. A load resistor (RL) 210 is also connected between the output voltage 212 and ground. The voltages across the respective sense resistors 200 are fed back to the respective controllers 202.

The output current is typically divided equally among the n channels to maintain reliability by spreading the heat evenly and preventing the over-stressing of any one component. The sense resistors 200 accomplish this purpose by providing feedback of the currents in each respective channel to the respective controllers 202. Based on the feedback, the controllers 202 adjust the respective duty cycles of the rectangular wave voltage controlling the respective switches 204 to achieve forced current sharing (i.e., substantially identical output currents from respective channels).

Figure 3:
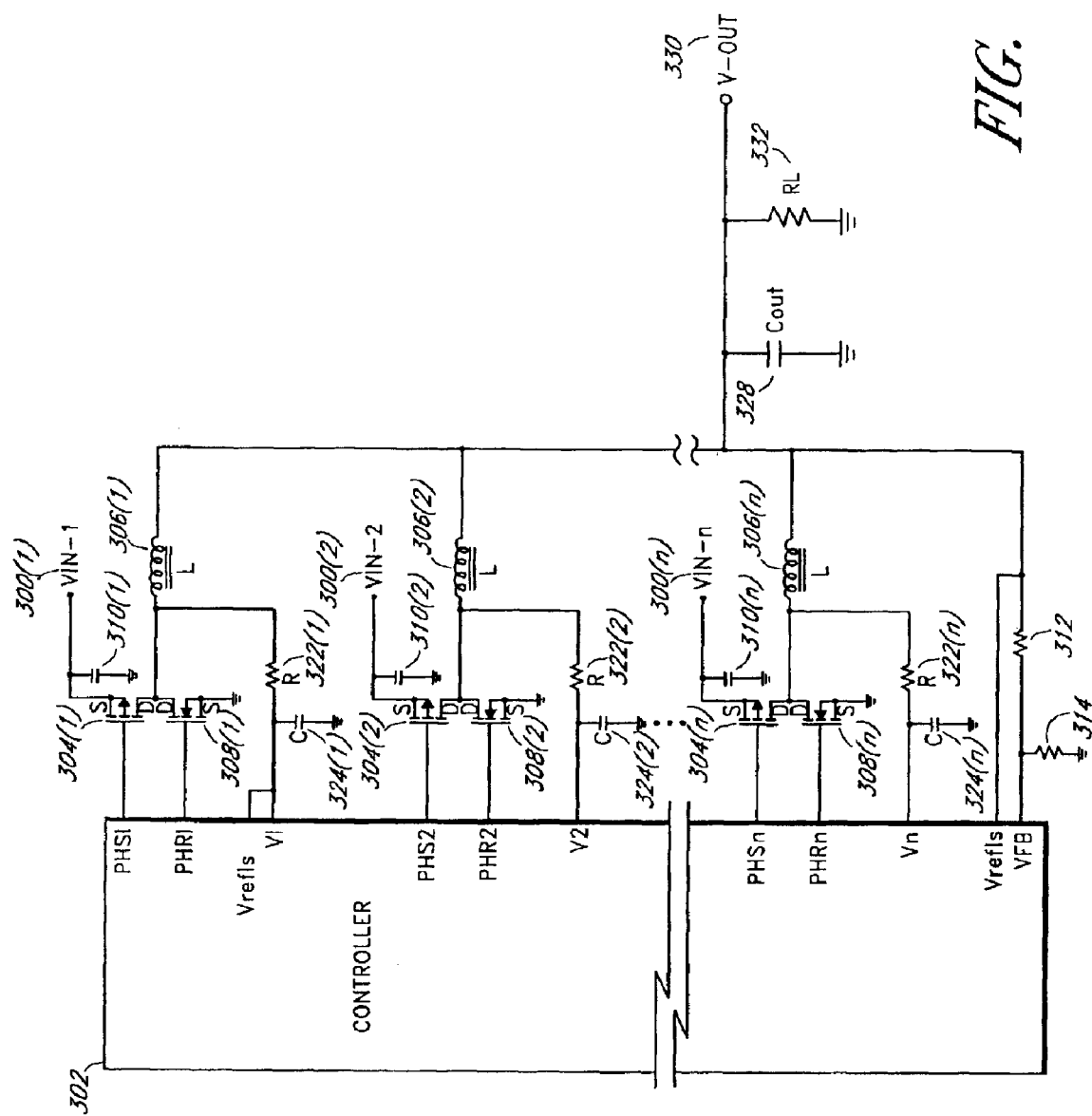
FIG. 3 is a schematic diagram of one embodiment of a multiphase switching converter using sensed voltages to achieve accurate current sharing.

FIG. 3 is a schematic diagram of one embodiment of a multiphase switching converter in accordance with the present invention which uses sensed voltages to achieve accurate current sharing without using current sensing resistors. The multiphase switching converter includes n voltage sources shown as 300(1)–300(n) (collectively the voltage sources 300) that are provided to respective source terminals of n P-MOSFETs shown as P-MOSFETs 304(1)–304(n) (collectively the P-MOSFETs 304). The multiphase switching converter also includes n input capacitors shown as input capacitors 310(1)–310(n) (collectively the input capacitors 310) that are connected between the respective voltage sources and ground. The drain terminals of the P-MOSFETs 304 are connected to the drain terminals of n respective N-MOSFETs shown as N-MOSFETs 308(1)–308(n) (collectively the N-MOSFETs 308). The source terminals of the N-MOSFETs 308 are connected to ground. The body (e.g., substrate) terminals of the N-MOSFETs 308 and the P-MOSFETs 304 are connected to their respective source terminals.

The controller 302 provides n rectangular wave voltages (PHS1–PHSn) to drive the gate terminals of respective P-MOSFETs 304. The controller 302 also provides n rectangular wave voltages (PHR1–PHRn) to drive the gate terminals of respective N-MOSFETs 308. The drain terminals of the P-MOSFETs 304 and the N-MOSFETs 308 are connected to the input terminals of n respective inductors shown as 306(1)–306(n) (collectively the inductors 306). The output terminals of the inductors 306 are commonly connected to provide an output voltage 330. An output capacitor (Cout) 328 is connected between the output voltage 330 and ground. A load resistor (RL) 332 is also connected between the output voltage 330 and ground.

A feedback network coupled to the output voltage 330 provides a feedback voltage (VFB) to the controller 302. In one embodiment, the feedback network is a resistor divider network implemented by resistors 312, 314. Alternate feedback networks, such as a differential amplifier to provide differential remote voltage sensing, can also be implemented to provide the feedback voltage VFB.

The voltages at the input terminals of the respective inductors 306 are fed back to the controller 302 via n respective series resistors shown as 322(1)–322(n) (collectively the resistors 322) followed by n respective parallel capacitors shown as 324(1)–324(n) (collectively the capacitors 324) connected to ground. The resistors 322 and the capacitors 324 operate as lowpass filters.

Accurate current sharing is achieved by comparing the voltage waveforms from the input terminals of the respective inductors 306. The voltage waveforms from the input terminals of the respective inductors 306 are lowpass filtered by the respective resistors 322 and the respective capacitors 324 to provide the sensed voltages (V1–Vn) to the controller. The sensed voltages V1–Vn can be derived using other lowpass filter configurations. The sensed voltages represent the average voltages (i.e., DC) of the respective voltage waveforms applied to inductors 306. The sensed voltages are responsive to magnitudes of the respective voltage sources 300 and to the duty cycles of the respective voltage waveforms applied to the inductors 306. Substantially identical sensed voltages result in substantially identical currents through respective inductors 306.

The P-MOSFETs 304 and the N-MOSFETs 308 function as switches that alternately connect the respective inductors 306 to the respective voltage sources 300 and to ground. For example, when the gate terminals of the P-MOSFETs 304 are low, the P-MOSFETs 304 conduct and connect the input terminals of respective inductors 306 to the respective voltage sources 300. When the gate terminals of the N-MOSFETs 308 are high, the N-MOSFETs 308 conduct and connect the input terminals of respective inductors 306 to ground. The function of the P-MOSFETs 304 can be implemented by N-MOSFETs with appropriate changes to the drivers in the controller 302.

The sensed voltages V1–Vn are advantageously derived from the input terminals of the respective inductors 306. Variations of the ON resistances of the MOSFETs 304 and variations of other circuitry parameters in the controller 302 are automatically compensated.

Figure 4:
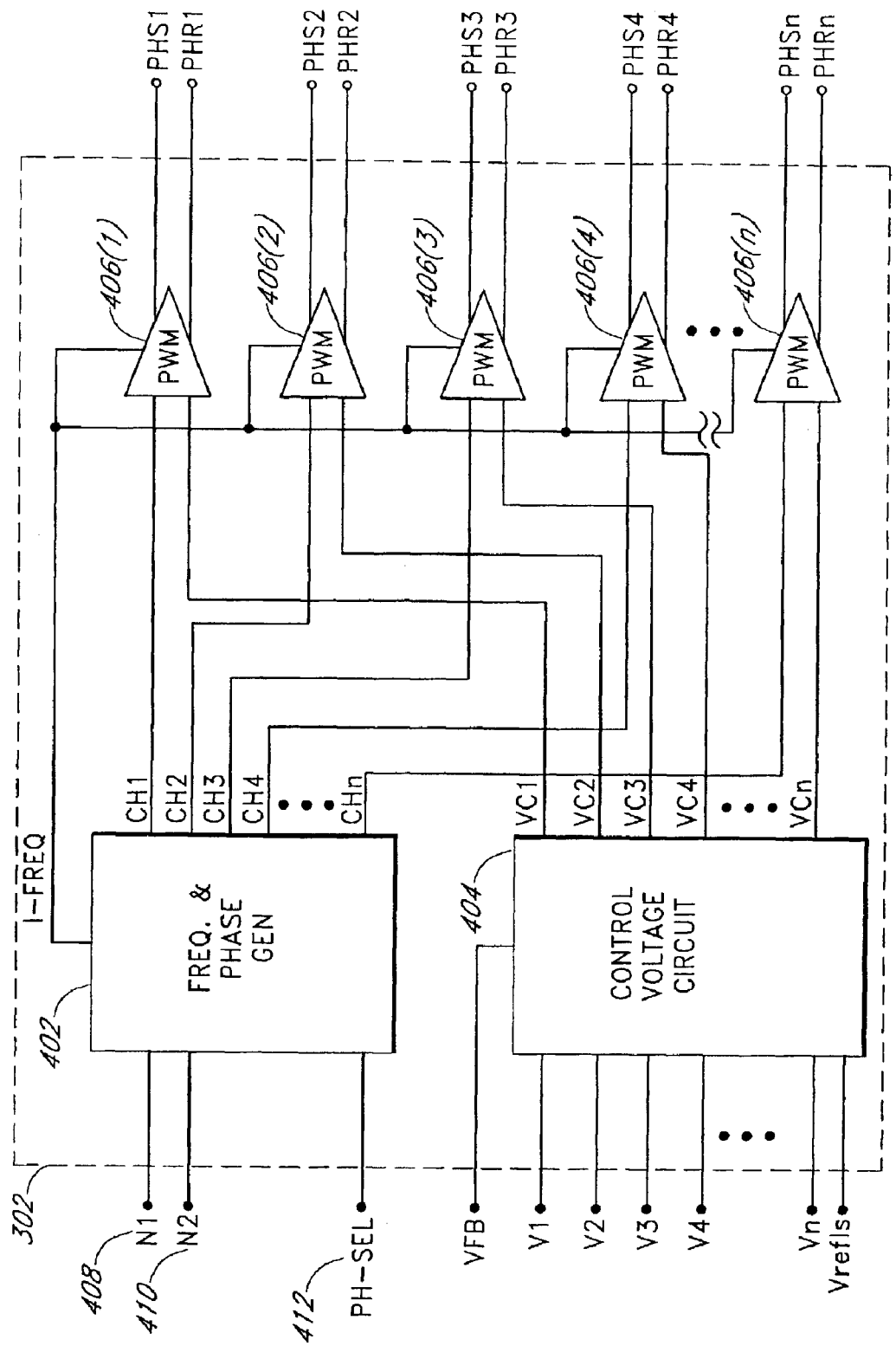
FIG. 4 is a block diagram of one embodiment of the controller shown in FIG. 3.

FIG. 4 is a block diagram of one embodiment of the controller 302 shown in FIG. 3. The controller 302 includes a frequency and multiphase generator 402, a control voltage circuit 404, and n PWM circuits shown as PWM circuits 406(1)–406(n) (collectively the PWM circuits 406).

The frequency and multiphase generator 402 generates a current (I-FREQ) indicative of an operating frequency and generates n pulses (CH1–CHn) of various phases at the operating frequency. The operating frequency is determined by external components coupled to an input node (N1) 408 and an input node (N2) 410 of the frequency and multiphase generator 402. The phases can be adjusted by applying a signal to a phase-select input 412. The current I-FREQ is provided to each of the PWM circuits 406. The n pulses CH1–CHn are provided to the respective PWM circuits 406 such that the outputs of the PWM circuits 406 also exhibit the various phases.

The control voltage circuit 404 receives the sensed voltages V1–Vn as inputs and generates n control voltages (VC1–VCn) for the respective PWM circuits 406. The PWM circuits 406 generate respective pairs of rectangular wave voltages (PHS1, PHR1 . . . PHSn, PHRn). The rectangular wave voltages of each pair (PHS, PHR) are substantially identical and have identical phases. The phases between different pairs of rectangular wave voltages are different. The rectangular wave voltages drive the respective switches 304, 308 of the multiphase switching converter. Each circuit block in the controller 302 is described in further detail below.

Figure 5:
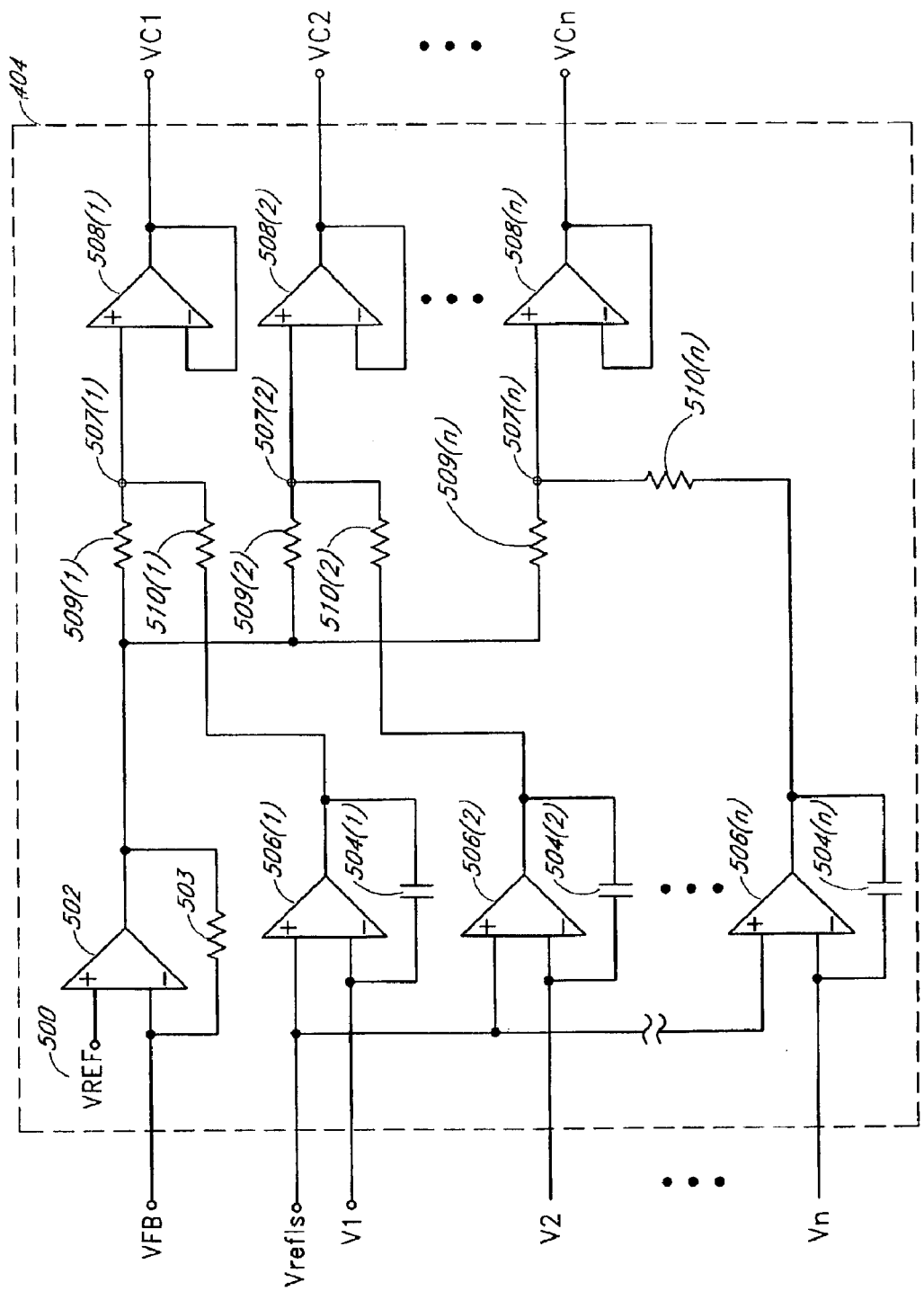
FIG. 5 is a schematic diagram of one embodiment of the control voltage circuit shown in FIG. 4.

FIG. 5 is a schematic diagram of one embodiment of the control voltage circuit 404 used for forced current sharing. The sensed voltage $V_{REFLS}$ of a reference channel in the n-channel multiphase converter is provided to non-inverting (+) inputs of n offset amplifiers shown as offset amplifiers 506(1)–506(n) (collectively the offset amplifiers 506). The sensed voltages V1–Vn of n slave channels are provided to the inverting (−) inputs of the respective offset amplifiers 506. Offset voltages are generated at the respective outputs of the offset amplifiers 506 in proportion to the difference between the reference sensed voltage and the respective slave sensed voltages. In one embodiment, the offset amplifiers 506(1)–506(n) are integrating amplifiers with feedback capacitors 504(1)–504(n), respectively.

An error amplifier 502 compares the feedback voltage VFB with a reference voltage (VREF) 500. The reference voltage 500 is generated from one of the voltage sources 300 by a reference converter (not shown). The feedback voltage VFB is proportional to the output voltage 330. The output of the error amplifier 502 is provided through resistors 509(1)–509(n) to respective summing nodes 507(1)–507(n) (collectively the summing nodes 507). The output of the error amplifier 502 is summed with the outputs of the respective offset amplifiers 506(1)–506(n) at the summing nodes 507. The sums from the summing nodes 507 are provided to the non-inverting inputs of n slave feedback amplifiers 508(1)–508(n), respectively (collectively, the slave feedback amplifiers 508). Each slave feedback amplifier 508 has its respective output connected to its respective inverting (−) input.

The outputs of the feedback amplifiers 508 are control voltages (VC1–VCn) used to adjust the duty cycles of the respective PWM circuits 406. The control voltages are derived from the sums of the respective offset voltages and the output of the error amplifier 502. The offset voltages are proportional to the differences between the sensed voltage of the reference channel and the sensed voltages of the respective slave channels. The offset voltages ensure that the duty cycles of the voltage waveforms applied to the inductors 306 of the respective channels result in substantially identical sensed voltages, thereby effectuating forced current sharing. The output of the error amplifier 502 is provided to all the feedback amplifiers 508 to affect the duty cycles of the respective PWM circuits 406 similarly, thereby distributing changes in the load current evenly among the channels.

In one embodiment, a single-phase synchronizing converter is configured to automatically synchronize with other single-phase synchronizing converters on a peer-to-peer basis. These synchronizing converters are operated in parallel to produce a multiphase converter where each synchronizing converter corresponds to one channel of the multiphase converter. Phasing is automatic, and the phasing changes as phases (channels) are added or removed. For example, three synchronizing converters can be used to initially create a three-phase solution for an existing processor. A fourth phase can be added to quickly change the multiphase converter to a four-phase system. Each time power is applied, the converters arbitrate among themselves for phase position. Thus, the phasing positions are random but the phasing is symmetrical regardless of the number of phases. In one embodiment, a hot-swappable single-phase module can be plugged into any location of a parallel multiphase bus to produce a common output voltage. Each time an additional module is plugged in (while power is on) the modules adjust their respective phases for phase symmetry. In one embodiment, each module shares a respective equal portion of the output load.

Figure 6A:
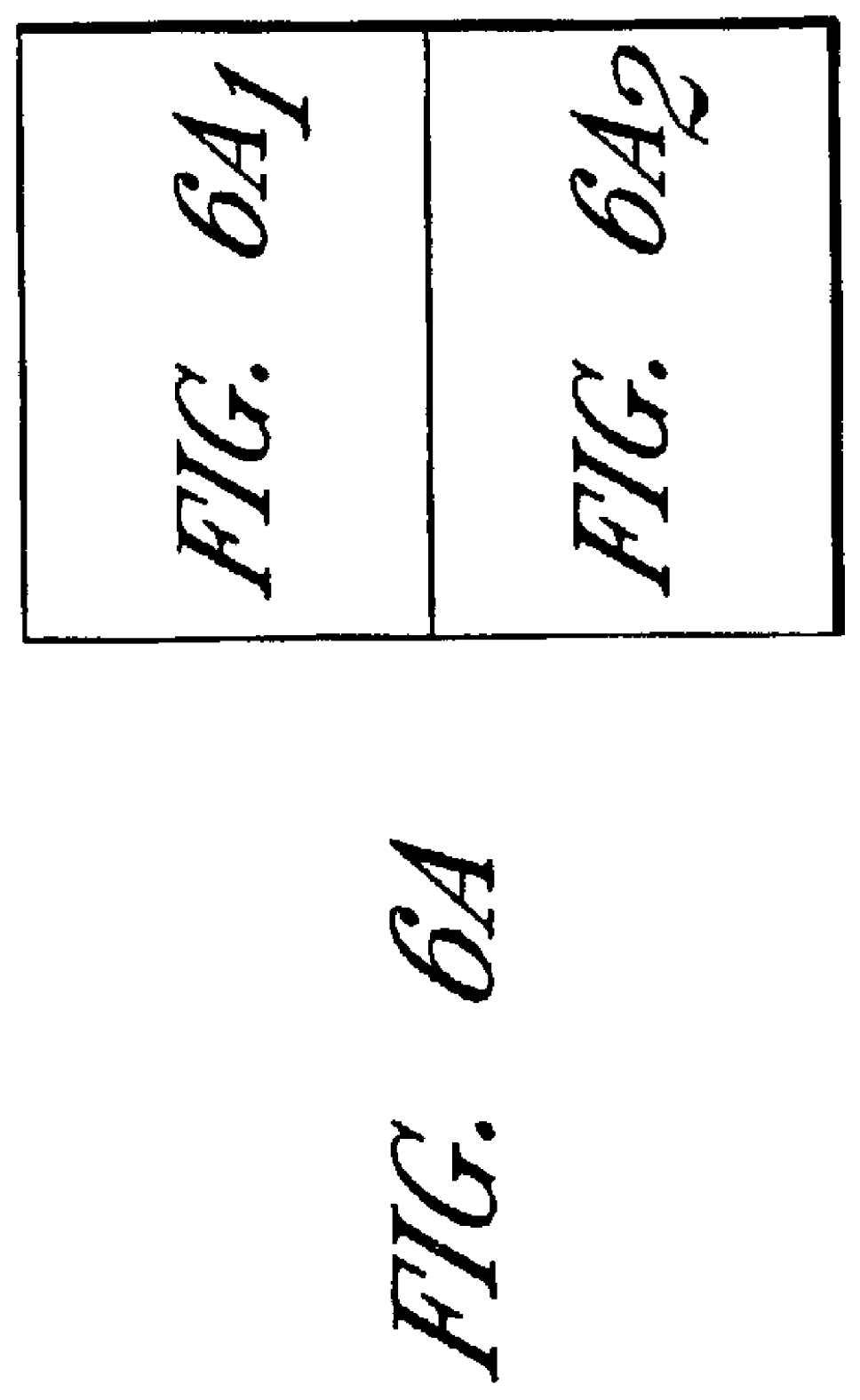

FIG. 6A is a block diagram of a single-phase synchronizing converter 600. In the converter 600, a triangle wave output of a triangle wave generator 601 is provided to an input of a sample-and-hold circuit 602. A reset-cap control line, a start-discharge control line, and a start-charge control line are provided to the triangle wave generator 601 to control the triangle wave generated by the triangle wave generator 601. A reference voltage Vref is also provided to the triangle wave generator 601. A sample-hold control line is provided to a control input of the sample-and-hold circuit 602. An output of the sample-and-hold circuit 602 is provided to a first input of a timing error amplifier 603. The timing error amplifier 603 amplifies an error (e.g., a difference) between the output of the sample-and-hold circuit 602 and the reference voltage Vref. The timing error amplifier 603 also integrates the amplified error signal. A reset-EA control line is provided to a control input of the timing error amplifier 603 to reset the integration. A dither signal is provided from a dither generator 627 to the timing error amplifier 603 to introduce a timing dither used to clear an overlap condition. When an overlap is detected, a random timing dither is generated by the dither generator 627.

An output (reset EA) of the timing error amplifier 603 is provided to a reset input of a PWM position generator 604. An output of the PWM position generator 604 is provided to an input of a channel pulse generator 605. The channel-pulse generator 605 generates a PWM command pulse. A channel-pulse output of the channel pulse generator 605 is provided to a channel-pulse input of a pulse position logic 613 and to a common phase control line (CPCL) driver 612. The channel pulse output is also provided to a command-pulse input of a PWM converter 615 via a buffer 606. An output of the pulse position logic 613 is the reset-EA control line to the timing error amplifier 603. An output of the CPCL driver 612 is provided to a CPCL bus 611. The CPCL bus is provided to a CPCL input of the pulse position logic 613 and to a pull-down resistor 621.

A sync bus 610 is provided to a pull-up resistor 620, to an inverter 609, and to a sync input of a frequency sync generator 607. The sync bus 610 is an active-low bus, and therefore is shown as "\sync" in FIGS. 6 and 8. An output of the frequency sync generator 607 is provided to an open-collector type driver 608. An output of the driver 608 is provided to the sync bus 610.

The sync bus 610 and the CPCL bus 611 are provided to respective inputs of a control logic 614. A channel-pulse is provided to an input of the control logic 614. The control logic 614 outputs the reset-cap, start-discharge, start-charge, and sample-hold control signals discussed above.

The sync bus 610 is a common bus between the synchronizing converters. The CPCL bus 611 is also a common bus between the synchronizing converters. In one embodiment, the CPCL bus 611 is a tri-state type bus (that is, a bus driven with tri-state type drivers) with a common pull-down resistor. In one embodiment, the driver 612 that drives the CPCL bus 611 is a tri-state driver, such that the output impedance of the driver 612 only appears across the bus when the driver 612 is driving the bus 611 (the tri-state driver output goes to a high impedance when the driver 612 is not driving the bus 611).

The auto-interleaved synchronization module 600 uses an analog feedback type of approach to arbitrate phase symmetry among several modules. FIGS. 6–15 are disclosed in the context of analog technology. One of ordinary skill in the art will recognize that the analog techniques shown in FIGS. 6–15 can also be implemented digitally or by using a combination of analog and digital techniques. Each module 600 on the CPCL bus 611 tries to position its phase between the pulse that precedes its own pulse and the next pulse following. In one embodiment, each converter module 600 includes a feedback loop to position the module's phase between the pulse that precedes its own pulse and the subsequent pulse following it's own pulse. When a new module is plugged onto the bus, its pulse will appear between two other pulses and will momentarily throw off the phase symmetry of the system. The feedback loop of each converter module will reposition the phase of its module to maintain even symmetry in the system of modules.

Figure 6B:
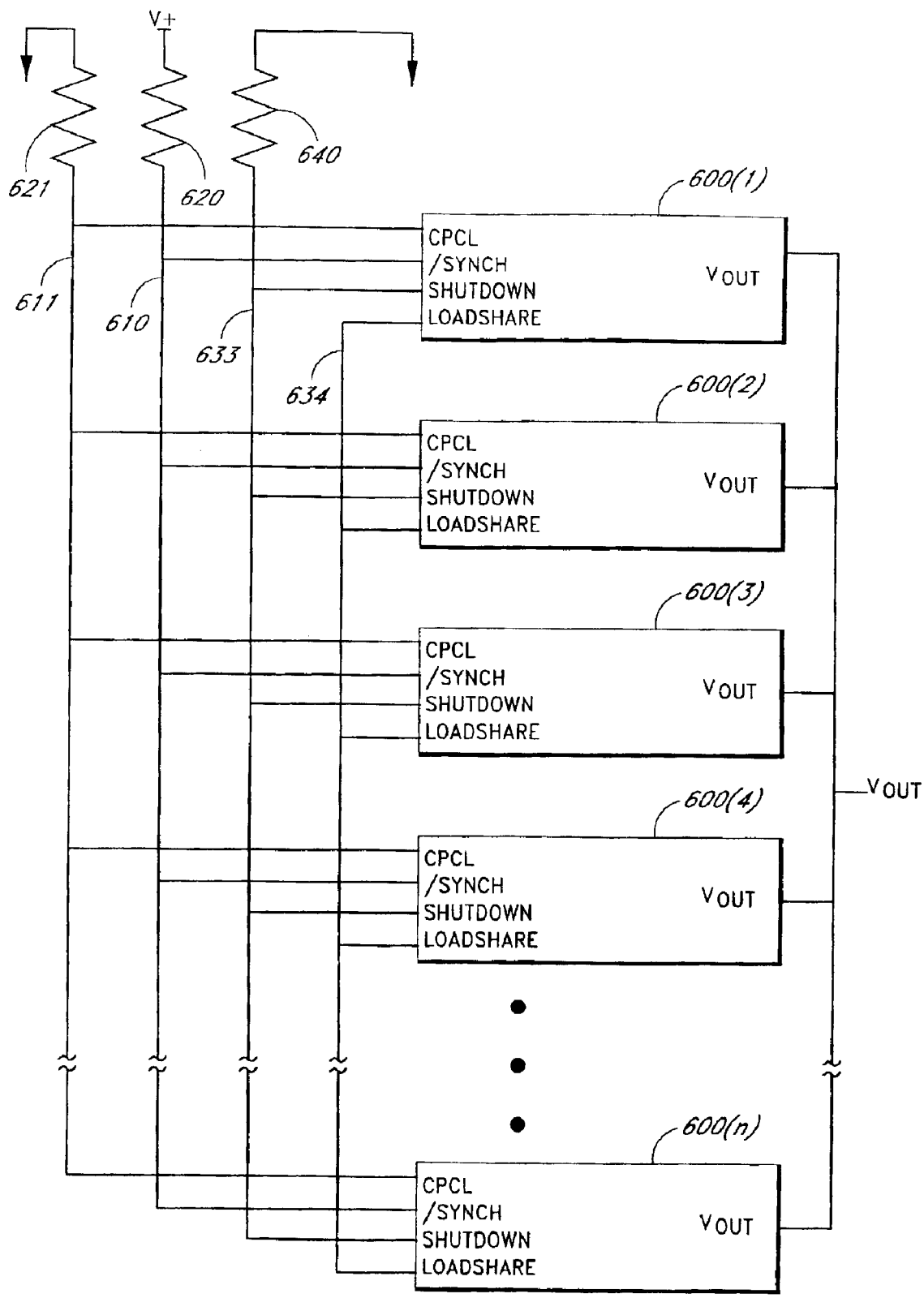
FIG. 6B illustrates the interconnection of a plurality of the auto-interleaved synchronizing modules of FIG. 6A to produce a multi-phase converter.

FIG. 6B illustrates a multi-phase converter that uses n modules 600, shown as modules 600(1), 600(2), 600(3), 600(4), and 600(n), where n is greater than or equal to one. Each module 600 is constructed in accordance with FIG. 6A. Each module 600 is connected to the sync bus 610 and to the CPCL bus 611. The outputs Vout of the modules are also connected together to form a single Vout (as is also shown in FIG. 3). Once each converter module 600 has arbitrated its phase position, each converter module 600 aligns its channel pulse at approximately the same point in time during each cycle. The internal feedback loop of each converter module 600 includes the PWM generator 615 that is synchronized to the channel pulse.

FIG. 6B also illustrates an open-collector shutdown bus 633 and a loadshare bus 634. The shutdown bus 633 and the loadshare bus 634 are optional and are not required for synchronization. The shutdown bus 633 provides a common shutdown line that allows any one of the converter modules 600 to shut down all of the converter modules on the shutdown bus 633. The loadshare bus 634 provides for load sharing among the converter modules 600.

Each feedback loop includes timers to determine the proper phase position for the module. In one embodiment, the timers use positive and negative current generators that charge and discharge a capacitor to produce a triangle waveform (having positive (e.g., rising) ramps and negative (e.g., falling) ramps). The ramps are produced by starting and stopping the positive and negative current generators with the proper timing. In the converter 600 of FIG. 6A, the triangle wave generator 601 produces the triangle waveform. A rising ramp of the triangle waveform is started by a signal from the start-charge control line. A falling ramp of the triangle waveform is started by a signal from the start-discharge control line. In one embodiment, the rising ramps are produced by a positive current generator that charges a timing capacitor, and the falling ramps are produced by a negative current generator that discharges the timing capacitor.

Figure 7:
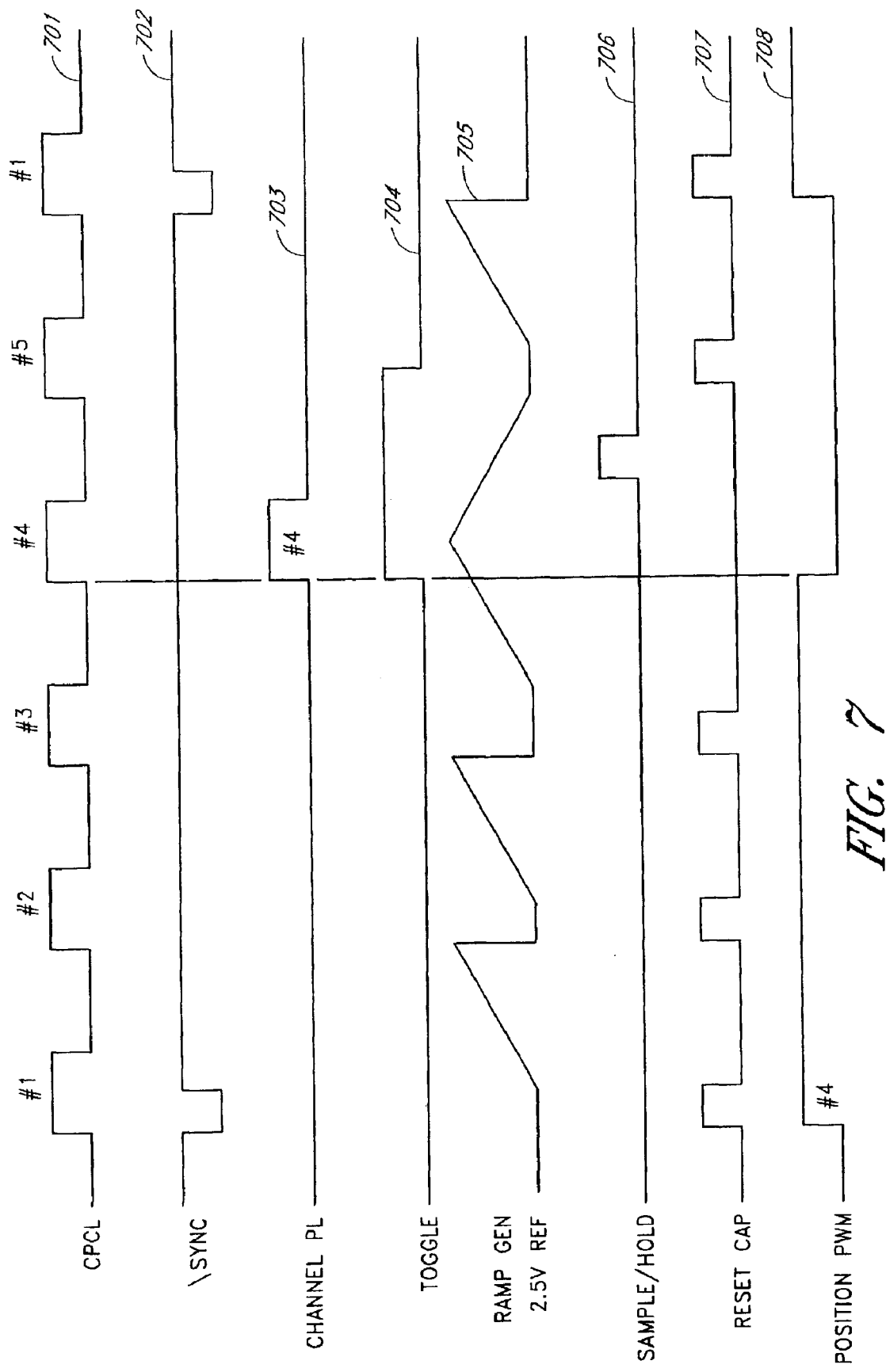
FIG. 7 depicts waveforms that illustrate the operation of a module of a multi-module system.

FIG. 7 illustrates timing and waveform diagrams for the converter 600(4) in a system with five converter modules 600 (i.e., where n=5). Each of the modules 600(1) through 600(n) works in a similar fashion. In FIG. 7, a waveform 701 corresponds to the CPCL bus 611. A waveform 702 corresponds to the sync bus 610. A waveform 703 corresponds to a channel pulse that controls the PWM 615. A waveform 704 corresponds to a toggle pulse used as part of the control logic. A waveform 705 corresponds to the triangle-type waveform generated by the triangle wave generator 601. A waveform 706 corresponds to the sample-and-hold control line. A waveform 707 corresponds to the reset-cap control line. A waveform 708 corresponds to the output of the PWM position generator 604.

The module 600(4) is used to explain the operation of the multi-phase system, with the understanding that such explanation can be applied to any of the modules. Each time the pulse on the CPCL bus 611 occurs (waveform 701), the reset-cap control signal is generated (waveform 707) unless the CPCL pulse was generated by the module 601(4). The reset-cap pulse resets the timing capacitor to a start voltage Vref (e.g., 2.5 volts) as shown by the waveform 705. After the timing capacitor is reset, the rising ramp starts, as shown in the waveform 705. If the next pulse on CPCL bus 611 is not the pulse generated by the module 600(4) (i.e., if the pulse is generated by one of the modules 600(2) through 600(n)), then the capacitor is reset and the rising ramp is restarted, as shown in the waveform 705. If the next pulse on the CPCL bus 611 is the pulse generated by the module 600(4), then a toggle bit is set (as shown in the waveform 704) to cause the capacitor reset to be gated off and to cause the falling ramp to start, as shown in the waveform 705. When the next pulse is detected on the CPCL bus 611, the falling ramp is stopped and a pulse (as shown in the waveform 706) on the sample-and-hold control line causes the voltage on the capacitor to be sampled as an end voltage. An error voltage is the difference between the start voltage Vref and the end voltage. The capacitor is reset (as indicated by the waveform 707) and the process starts over. The error voltage is processed and used to control the width of the position PWM pulse 708. At the end of the position PWM pulse 708, a channel pulse is generated (as shown in the waveform 703) that marks the module's phase position. The channel pulse is provided to the CPCL bus 611.

The error output of the timing error amplifier 603 is integrated, and the integrated error output is used to drive the pulse width of the position PWM 604 so that the location of the pulse generated by the position PWM 604 is centered between the pulse that started the rising ramp and the pulse that stopped the falling ramp. If both ramp rates are identical, then the ramp stop voltage will be the same as the ramp start voltage when the pulses have perfect symmetry. Since the timing error amplifier 603 reference voltage Vref is the same as the ramp start voltage, the timing error amplifier 603 produces an error voltage if the pulse position is not symmetrical. This error voltage changes the pulse width of the position PWM 604 to correct its channel pulse position for symmetry.

The sync pulse (as shown in the waveform 702) on the sync bus 610 starts the PWM position pulse (as shown in the waveform 708). The sample-and-hold feedback scheme operates on a cycle consistent with the frequency of the PWM 604. Thus, the sample-and-hold 602 has a relatively high sample rate (e.g., 200 kHz 1000 kHz, or more) which produces relatively fast settling and acquisition time.

The number of phases that can be combined is a function of the resolution of the logic and the operating frequency.

One of ordinary skill in the art will recognize that the rising ramp and the falling ramp described above are used as timers, and thus the rising ramp and falling ramp aspects of the system can be replaced by other timing techniques. Although the system is described above in terms of analog functions, one of ordinary skill in the art will recognize that the system can also be implemented using digital techniques (for example, the ramps can be implemented using one or more counters instead of the current sources and the capacitor). The analog implementation of the frequency sync generator 607 generates the fundamental operating frequency of the PWM 615.

The system described above is a peer-to-peer system where the modules arbitrate among themselves on a peer basis rather than a reference-slave basis. The reference/slave solution requires at least two different types of modules or operating modes (a reference and a slave). Thus, the reference/slave solution has more dedicated pins and has a structured layout configuration. In the peer-to-peer system, all of the modules can be identical. Optionally, the peer-to-peer modules can also be driven by an external sync frequency source.

Figure 8A:
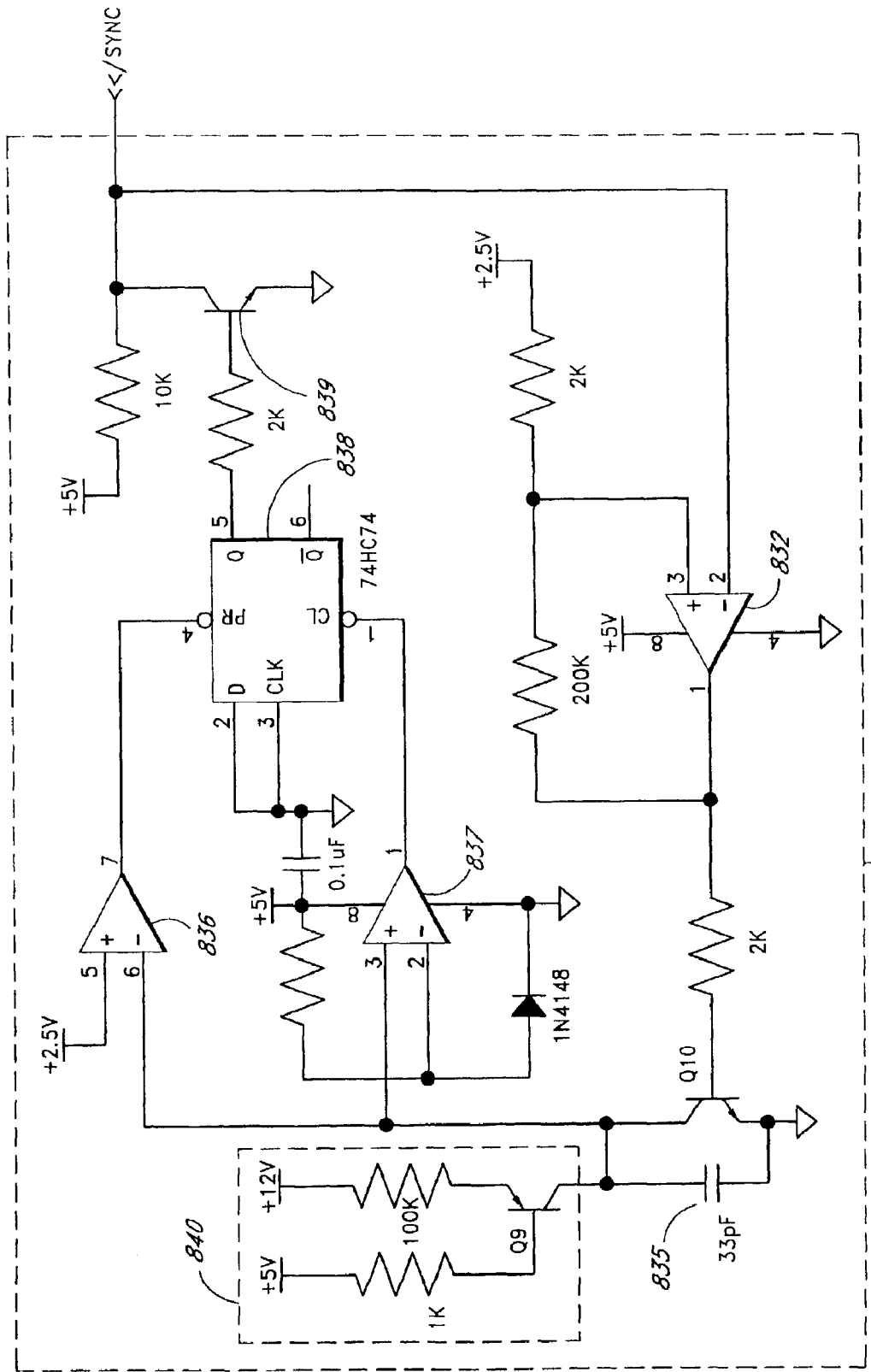
FIGS. 8A and 8B (consisting of FIGS. 8B1–8B4) illustrate an embodiment of the auto-interleaved synchronizing converter.
Figure 8B:
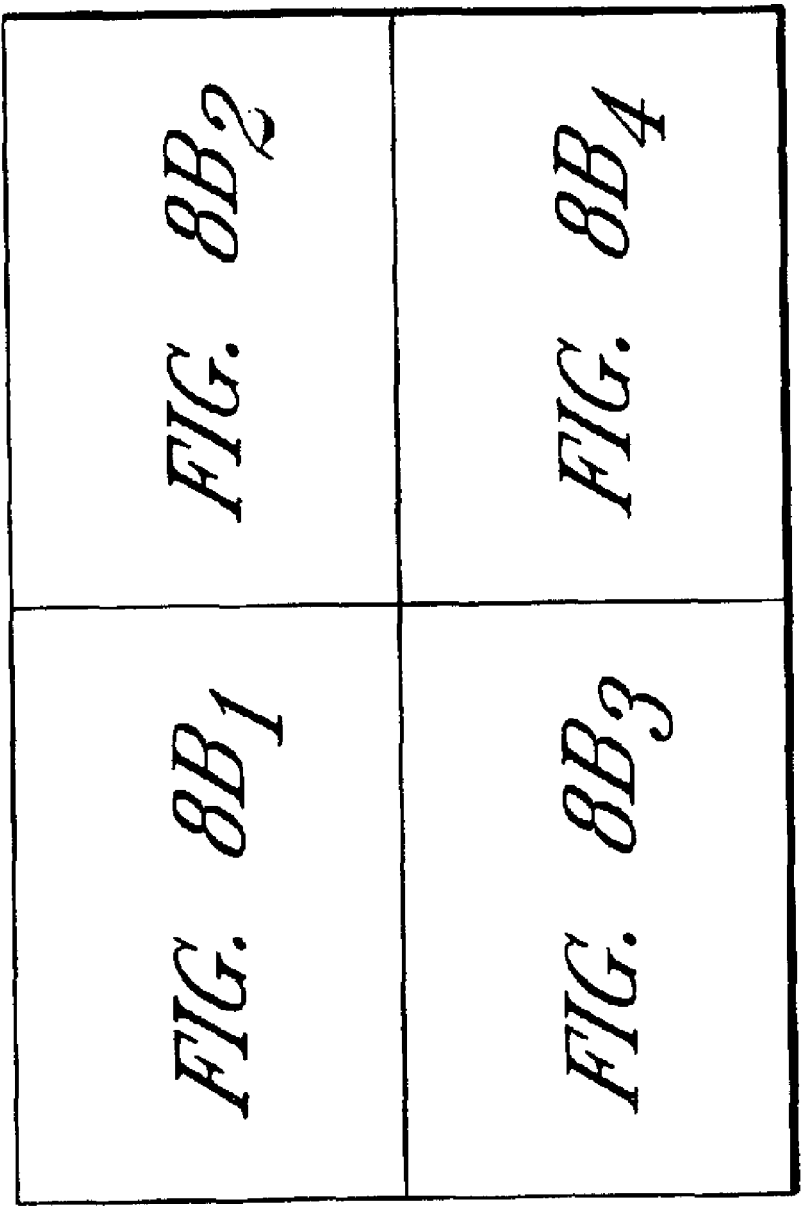

FIG. 8 (consisting of FIGS. 8A and 8B) illustrates one embodiment of a PWM 801 (FIG. 8B) and a sync generator 802 (FIG. 8A) for use in the converter 600. The PWM 801 includes a load sharing input as discussed above in connection with FIG. 5. The sync generator 802 is one embodiment of the sync generator 607 shown in FIG. 6B.

Figure 9A:
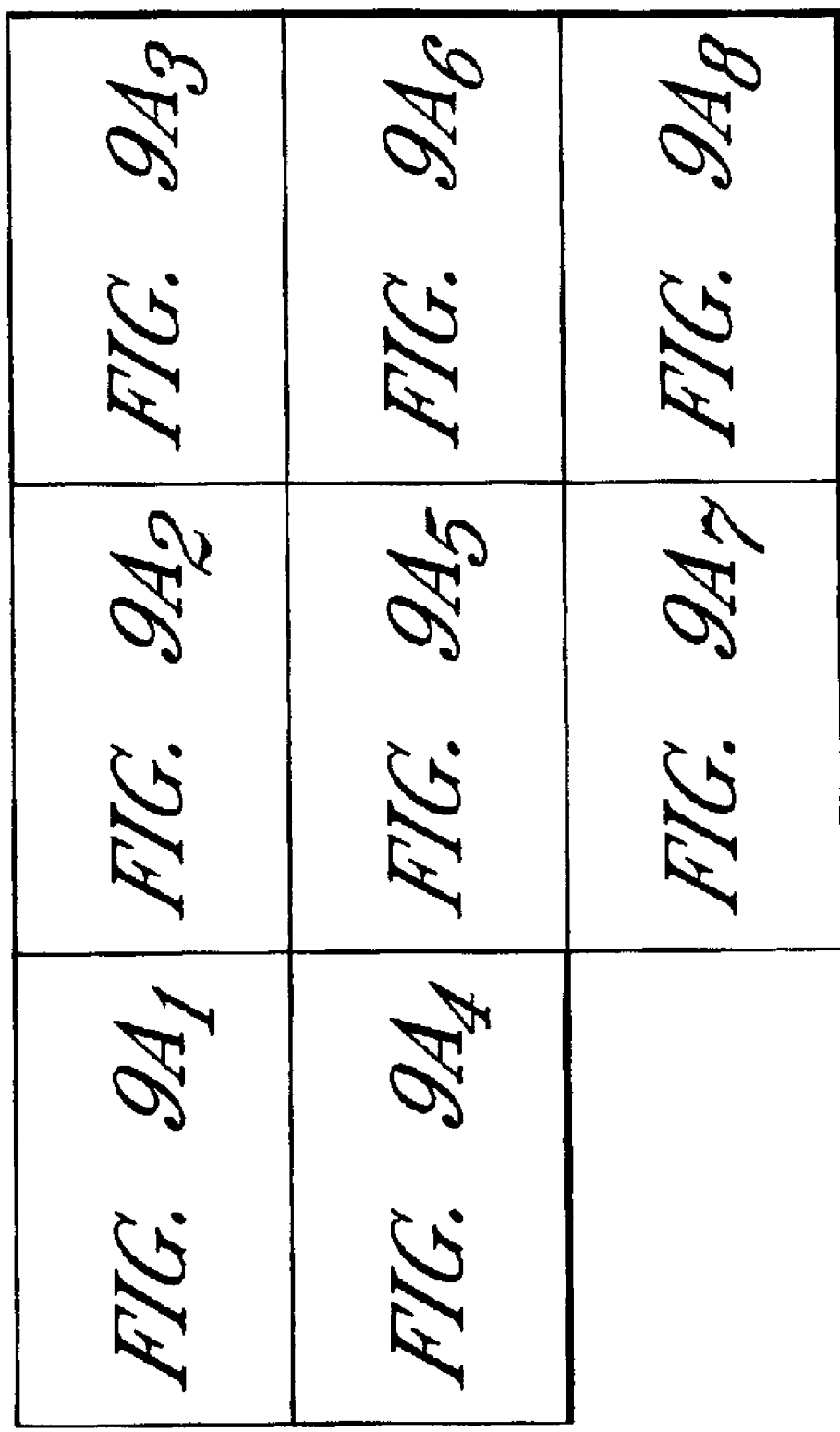
FIG. 9A (consisting of FIGS. 9A1–9A8) illustrates an embodiment of the channel pulse generator for the auto-interleaved synchronizing module of FIG. 8.

FIGS. 9A (consisting of FIGS. 9A1–9A8) illustrates one embodiment of the channel pulse generator 605 for use with the auto-interleaved synchronizing module of FIG. 8. The embodiment of FIG. 9A includes a triangle wave generator 901, which is one embodiment of the triangle wave generator 601; a sample-and-hold 902, which is one embodiment of the sample-and-hold 602; an integrating error amplifier 903, which is one embodiment of the timing error amplifier 603; a PWM position generator 904, which is one embodiment of the PWM position generator 604; a channel pulse generator 905, which is one embodiment of the channel pulse generator 605; pulse position logic 913, which is one embodiment of the pulse position logic 613; and control logic 914, which is one embodiment of the control logic 614.

The triangle wave generator 901 uses two current sources and a capacitor 950 to generate the triangle waveform. The control logic 914 starts the voltage ramp, resets the ramp capacitor back to the reference voltage via two parallel transmission gates 916a, 916b, toggles the current sources to ramp down the capacitor voltage, ends the ramp down, and samples-and holds the ramp voltage in another capacitor as the error signal for the error amplifier 903.

The phase position generator 904 can be described as a variable ON time one-shot. The ON time starts with the common sync pulse and ends when a channel pulse for this channel is centered between the CPCL pulse that precedes it and the CPCL pulse that follows it. If the ramp time up is not equal to the ramp time down, then the voltage on the sample-and-hold capacitor will be different than the reference voltage where the ramp started. Since the same reference voltage is used for the error amplifier 903, any difference on the sample-and-hold capacitor is used in the closed loop to change the ON time of the phase position generator 904, which in turn changes the position of the channel pulse. The channel pulse is generated by the falling edge of the phase position generator 904 pulse. This closed loop system forces the ramp up time to be equal to the ramp down time and therefore provides the desired symmetry between the different channel pulses of the different channels. Symmetry errors are created when the up current source and the down current source are not equal; however, perfect symmetry is not required.

Each converter 600 operates by knowing where its given channel pulse is in relation to other channel pulses on the common CPCL bus 611. This is done by clocking a D flip-flop 930 to produce a "toggle bit." The channel pulse is connected to the D input, and the pulses from the CPCL bus 611 are connected to the clock input. The toggle bit goes high when "this" channel's channel pulse occurs. The falling edge of each pulse on the CPCL bus starts the ramp UP voltage. At the next CPCL pulse, if the toggle bit is not set, the ramp timing capacitor is reset and made ready to ramp UP by the falling edge of this same CPCL pulse.

If at the next CPCL pulse the toggle bit is set, then the ramp down function is turned ON. At the leading edge of the next CPCL pulse during the ramp down function, the ramp down function is stopped and the ramp voltage is saved as a sample in another capacitor (in the sample-and-hold 902) to form the input signal for the error amplifier 903. The ramp capacitor 950 and the toggle bit are reset before the falling edge of this CPCL pulse and the process starts over again.

The CPCL bus 611 provides each converter channel the pulse position information of all the converters on the bus. This allows each converter channel to center itself between the pulse before and the pulse after itself. During power up, it is possible for two or more converter channel pulses to line up on top of each other and to appear as one channel pulse on the bus. A second purpose for CPCL bus 611 is to resolve this possibility. The CPCL bus 611 includes the pull-down resistor 621 having a resistance r. (r can be in a broad range of less that 100 ohms to greater than 1 megohm). In one embodiment, r is equal to approximately 1000 ohms). The CPCL bus driver 612 has an output impedance of r ohms. The bus driver 612 is a tri-state driver so that its output impedance r is connected to the bus only during its pulse duration. If only one driver 612 is on at any given time, then the voltage amplitude of the pulse on the bus is Vcc/2 (e.g., 2.5 volts for a system where Vcc=5 volts). If two or more pulses occur at the same time on the bus, or overlap, then the amplitude of the pulse on the bus will increase well above the Vcc/2 level. One of ordinary skill in the art will recognize that the pull-down resistor 621 and the output impedance of the driver 612 create a voltage divider. The two impedances need not be equal to allow detection of overlapped pulses.

A comparator 913 on each converter detects when two or more channels overlap on the bus. In the illustrated embodiment, the output of the comparator 913 resets the error amplifier. The output of the comparator 913 advantageously forces the overlapped pulses to separate to allow the converter 600 to move its channel pulse into a symmetrical position. Preferably, when an overlap is detected, the converter 600 moves its channel pulse in a random manner to eliminate the detected overlap. In the illustrated embodiment, a random noise generator (shown, for example in FIG. 10) is advantageously used to generate a random movement of the channel pulse.

It is possible for two or more channels to overlap in phase position during power-up or when another channel is added to the bus. As described below in connection with FIG. 10, the reset circuit for overlap uses a random sequence so that the two overlapped channels will move their phase positions by different amounts, in different directions or by different amounts and in different direction so that they separate. The reference voltage for the error amplifier 603 has a control circuit that dithers (e.g., increases or decreases) the reference voltage setting by ±x millivolts. The dither signal is generated by the dither generator 627. The amount of change is advantageously chosen to be sufficient to move the channel pulse by more than one pulse width when the integrating capacitor in the feedback of the error amplifier 603 is shorted out. The integrating error amplifier 603 typically does not respond fast enough with the integrating capacitor in the feedback loop.

The sync circuit 802 and the sync bus 610 establish the operating frequency for a single converter 600 or the operating frequency for all converters 600 on the sync bus 610. The sync circuit 802 allows all of the converters 600 on the bus to operate together. The sync circuit 802 includes a generator with a positive current source that generates a rising voltage ramp using a sync timing capacitor 835. A high voltage limit comparator 836 and a low voltage limit comparator 837 detect, respectively, a high voltage limit and a low voltage limit of the ramp circuit. When the ramp voltage exceeds a high limit, the high voltage limit comparator 836 sets a latch 838 that turns on a transistor 839 to pull the sync bus 610 low. A third comparator 832 detects the sync bus 610 in its low state and discharges the timing capacitor 835. When the ramp voltage goes below the low limit, the low voltage limit comparator 837 resets the sync latch 838 and the transistor 839 turns off, to allow the sync bus 610 to go high. When the sync bus 610 goes high, the comparator 832 stops discharging the timing capacitor 835 and allows the ramp voltage to start up again. The sync bus 610 has a common pull-up resistor 620 connected to Vcc. Thus, the frequency of operation is set by the values of the timing capacitor 835, the current source 840, the high and low voltage settings on limit comparators 836, 837, and the time to discharge the timing capacitor 835. The absolute frequency of operation is usually not critical.

When two or more converters 600 are used on a common sync bus 610, only one converter 600 will be in control of the sync bus 610 and the operating frequency. The converter 600 that has its ramp voltage reach the high limit setting first will pull the sync bus 610 low. This causes the comparator 832 in each converter 600 connected to the sync bus 610 to reset its respective timing capacitor 835. Thus, the fastest converter 600 will set the frequency. If the fastest sync circuit 802 is removed from the sync bus 610, then the next-fastest sync circuit 802 controls the frequency, possibly resulting in a slight shift in operating frequency.

In an alternate embodiment, an external clock generator can be used to drive the sync bus 610, as long as the external clock generator operates at a frequency higher than the fastest sync circuit 802 connected to the sync bus 610. In one embodiment, the timing capacitor 835 is external to an integrated circuit containing the sync generator 802. An external timing capacitor 835 allows the operating frequency to be selected by selecting the capacitor 835. Alternatively, the external timing capacitor 835 can be replaced with a pull-down resistor to disable frequency generation by the sync circuit 802 and to allow an external sync generator to generate the sync pulses.

The PWM converter 801 shown in FIG. 8B includes circuitry for implementing load sharing among several converters as described in connection with FIG. 6B. To provide load sharing, each converter 801 is connected to a common loadshare bus 860. The load sharing feature of the converter 801 is configured to work with a bus configuration where the number of converters 600 on the bus can increase or decrease. Each converter 600 automatically adjusts its output current to share an equal amount of the total load current.

The converter 801 has a voltage feedback error amplifier 850 and a FET driver 851 for a half bridge 852. The converter 801 is configured as a synchronous rectification, buck, DC-to-DC converter. The output of the half bridge 852 is provided to an output inductor 866. The converter 802 uses an error amplifier 855 to facilitate load sharing.

Each converter 600 on the loadshare bus 860, has a voltage reference set to the same voltage. The normal voltage feedback loop for each converter 801 tries to set the output voltage level, thus producing an average voltage level setting. A portion of the voltage on the loadshare bus 860 is added to the normal feedback loop of the converter 801 at a node 861. The voltage on the loadshare bus can offset the resulting output duty cycle by approximately +/−10%. This creates a loadshare feedback loop that allows relatively small changes to the duty cycle to force the same voltage drop across the output inductor 866 of each converter 801 on the loadshare bus. A relatively low frequency integrating capacitor 864 allows relatively high DC gain in the loadshare feedback loop around the amplifier 855. In one embodiment, the loadshare bus 860 is a relatively high impedance bus.

The loadshare bus 860 is provided to the non-inverting input of the loadshare error amplifier 855. The loadshare bus 860 is connected via a resistor 862 to an output of a filter 870. An input of the filter 870 is provided to the input side of the output inductor 866. In one embodiment, the filter 870 is a lowpass filter. The output of the filter 870 is also provided through a resistor 867 to an inverting input of the error amplifier 855. If the filtered voltage level of one converter 801 on the loadshare bus 860 is not the same as the filtered voltage levels of the other converters 801 on the loadshare bus 860, then a current will flow through the resistor 862 producing a voltage drop that is amplified by the error amplifier 855. Each converter 801 will adjust its filtered voltage level so that no current flows through its summing resistors 862 on the loadshare bus 860. This causes each converter to conduct an approximately equal share of the total output current through its output inductor 866.

The PWM converter 801 includes current-limit detection and shutdown logic. Current-limit detection and control is accomplished by using the equivalent series resistance (ESR) of the inductor 866 as the over-current sensing element. The output voltage appears on one side of the inductor ESR, and the filter 870 outputs the DC and low frequency components on the other side of the inductor ESR. An amplifier 878 and comparator limit detector 871 are referenced to the output voltage. The amplifier 878 amplifies the voltage level produced across the inductor ESR when output current flows through the inductor 866. The comparator 871 has a fixed positive voltage limit, referenced to the output voltage. The gain of the amplifier 878 and the voltage limit determine the over current limit.

In a multiphase system with similar converters sharing current to drive a load, it is a reasonable assumption that if one controller hits its current limit then the others are very close to their respective current limits. Moreover, it is a reasonable assumption that if the converter that hits its current limit stops current sharing then all of the other converters will go into current limit. For this reason, in one embodiment, a shutdown bus 633 is included to turn off all the controllers at the same time and ramp the controllers down to a standby voltage. Also, in a multiphase system with current sharing into a heavy load, it is important that all phases should start up together or one phase will hit its current limit and shut down. The shutdown bus 633 is an open-collector type of bus with a single pull-down resistor tied between the bus and ground. The converter 801 has a current limit latch 872 that is set when a current limit condition occurs. The latch 872 pulls the shutdown bus 633 high. The other converters on the shutdown bus 633 set their current limit latch when the shutdown bus 633 goes high. The current limit latch 872 also discharges a soft-start capacitor through a fixed resistor. When the soft-start capacitor voltage reaches the low limit detector, it will reset the latch 872. When all the controllers 800 on the shutdown bus 633 reset their current limit latch 872, then the shutdown bus 633 goes low and each controller 800 initiates a soft start to return to normal operation. If the over-current limit still exists, all the controllers 800 on the bus 633 will again shut down. In one embodiment, the current sources for charging the soft-start capacitor produce substantially the same current, and the soft-start capacitors have substantially the same capacitance, thus producing substantially the same soft-start time constant in each converter.

Figures 10, 10A:
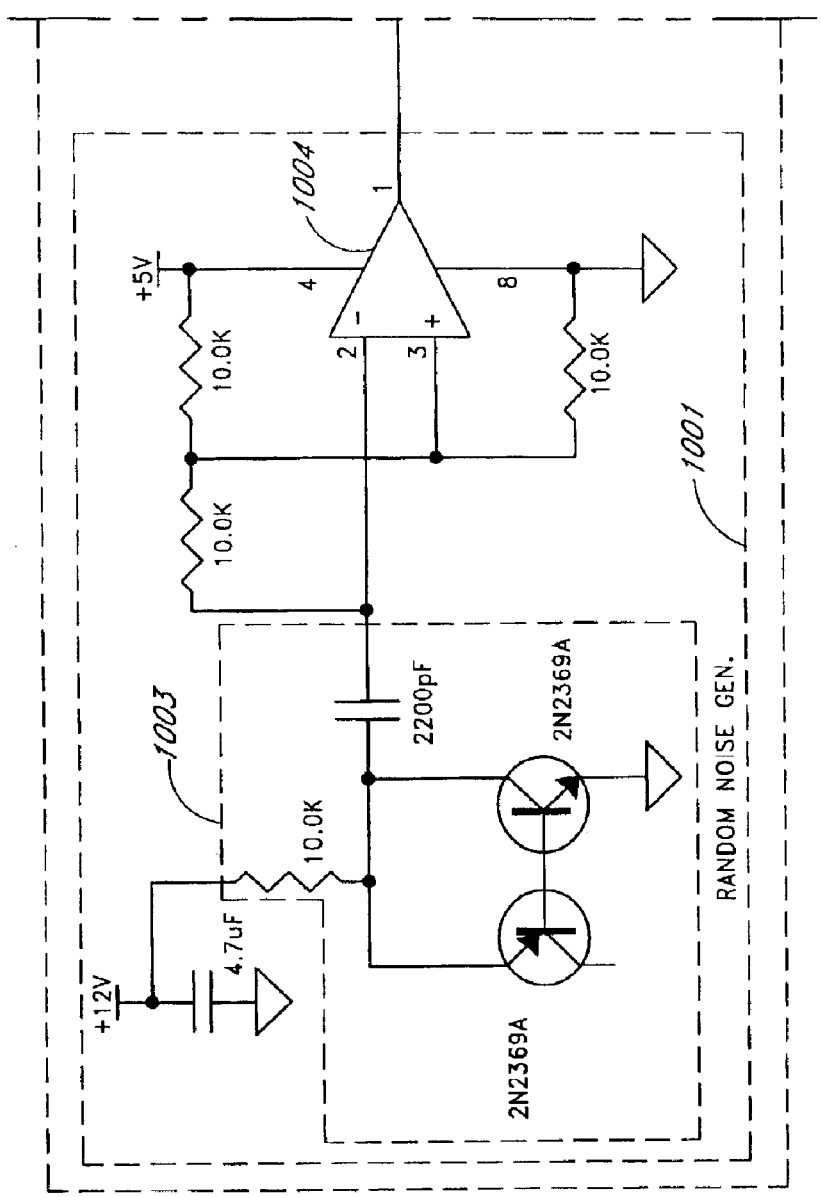
FIG. 10 (consisting of FIGS. 10A and 10B) illustrates an embodiment of a dither generator.
Figure 10B:
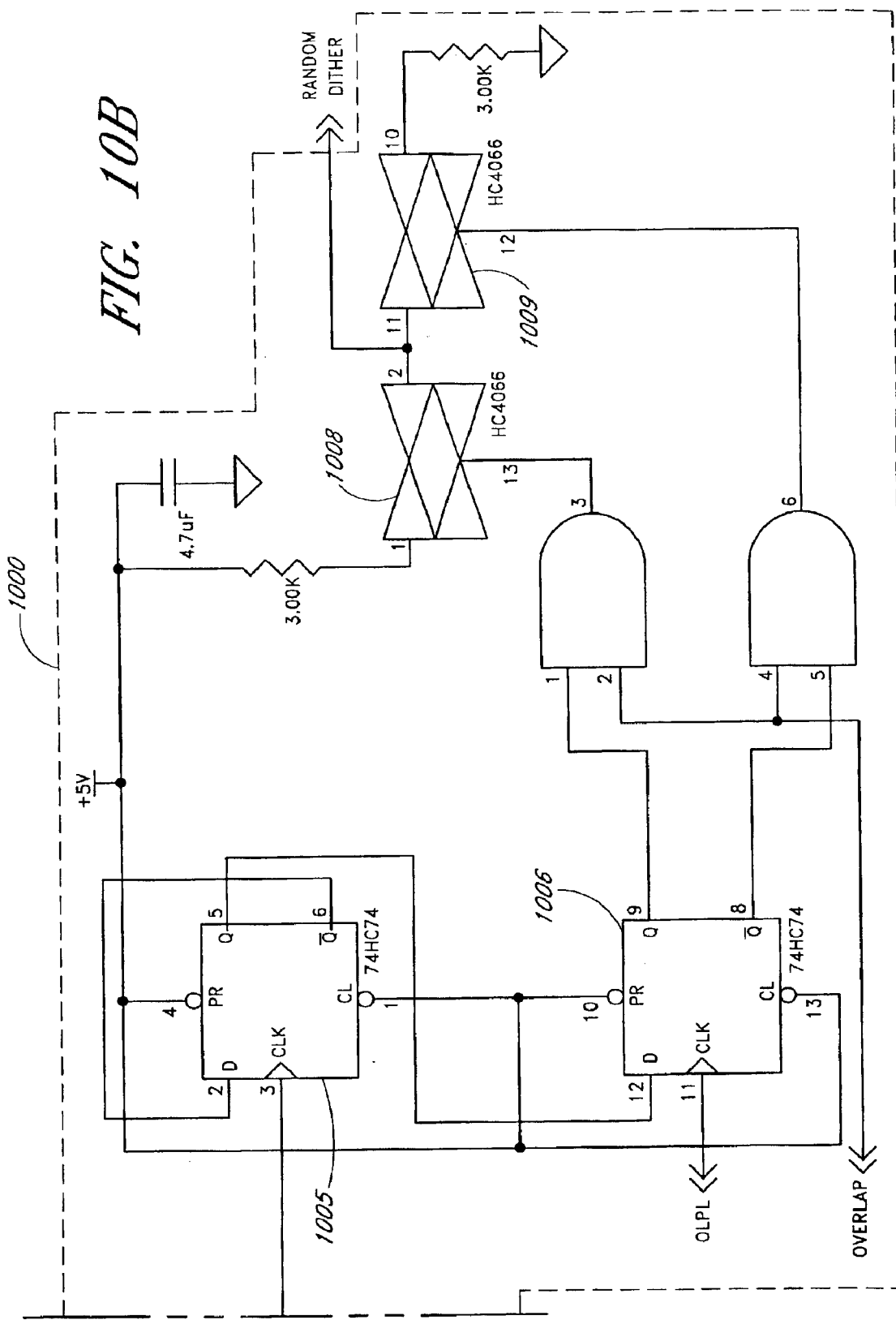

FIG. 10 illustrates a dither generator 1000 that is one embodiment of the dither generator 627. In the dither generator 1000, a transistor noise generator 1003 and a high-speed comparator 1004 produce a square wave logic signal that has a random sequence. This random logic signal is clocked through a toggle type flip-flop 1005. An output from the flip-flop 1005 is provided to a flip-flop 1006. The clock pulse for the flip-flop 1006 is the overlap pulse (OLPL) generated by the overlap comparator 913 (FIG. 9A8) by ANDing the overlap detected signal with the channel pulse (CPCL) signal. The Q and Q\ signals from the "D" flip-flop 1006 are ANDed with the overlap output of a re-triggerable one-shot in the overlap comparator 913 (FIG. 9A8). The overlap pulse (OLPL) is too narrow to allow for sufficient time to make the correction. Therefore the narrow overlap pulse (OLPL) clocks the re-triggerable one-shot to produce an overlap pulse that has an ON time longer than the time between two overlap pulses. This one-shot output stays high until the overlap pulses go away. The output of the one-shot is also used to generate the reset EA signal that resets the timing error amplifier 603. Each of the outputs from the AND gates (e.g., the Q output and the Q\ output of the flop-flop 1006 ANDed with the overlap signal) drives a respective analog switch 1008, 1009 to pull the reference voltage up or down for a random amount of time to move the channel pulses randomly with respect to each other, which causes the two overlapped channels to separate. This dither generator 1000 thus operates as a correction circuit that becomes active when an overlap is detected. When the overlap is corrected, the dither generator 1000 becomes inactive.

Figure 11:
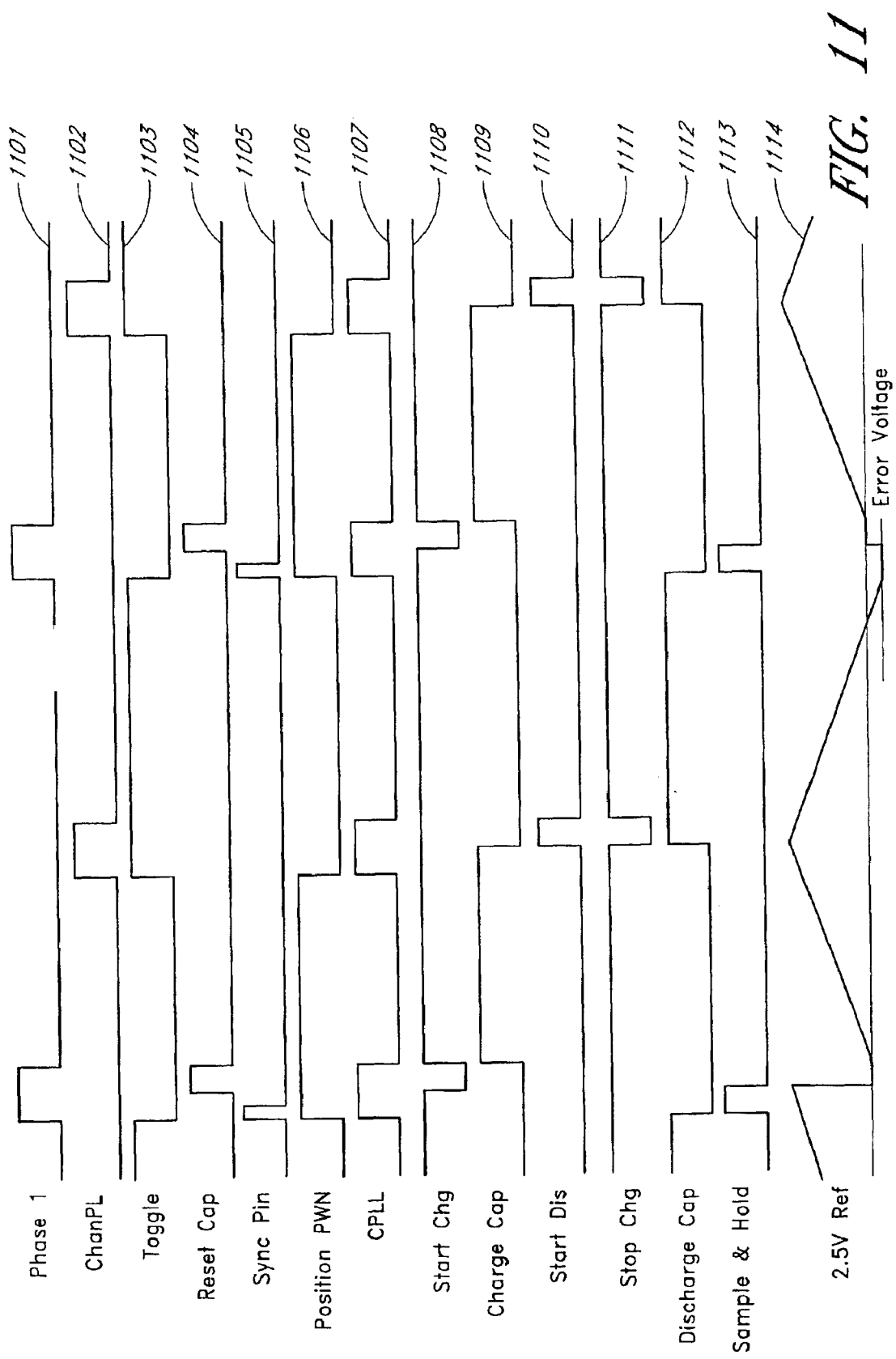
FIG. 11 depicts waveforms and timing diagrams that illustrate the operation of the automatic synchronizing module of FIGS. 8 and 9.

FIG. 11 illustrates waveforms and timing diagrams of the automatic synchronizing module shown in FIGS. 8 and 9A. The waveforms in FIG. 11 illustrate the operation of a multi-phase system with two converters (i.e., where n=2). FIG. 11 illustrates a phase 1 waveform 1101, a channel pulse waveform 1102, a toggle pulse waveform 1103, a reset-cap waveform 1104, a sync waveform 1105, a PWM position waveform 1106, a CPCL waveform 1107, a start-charge waveform 1108, a charge-cap waveform 1109, a start-discharge waveform 1110, a stop-discharge waveform 1111, a discharge-cap waveform 1112, a sample-hold waveform 1113, and a triangle waveform 1114.

Figure 12A:
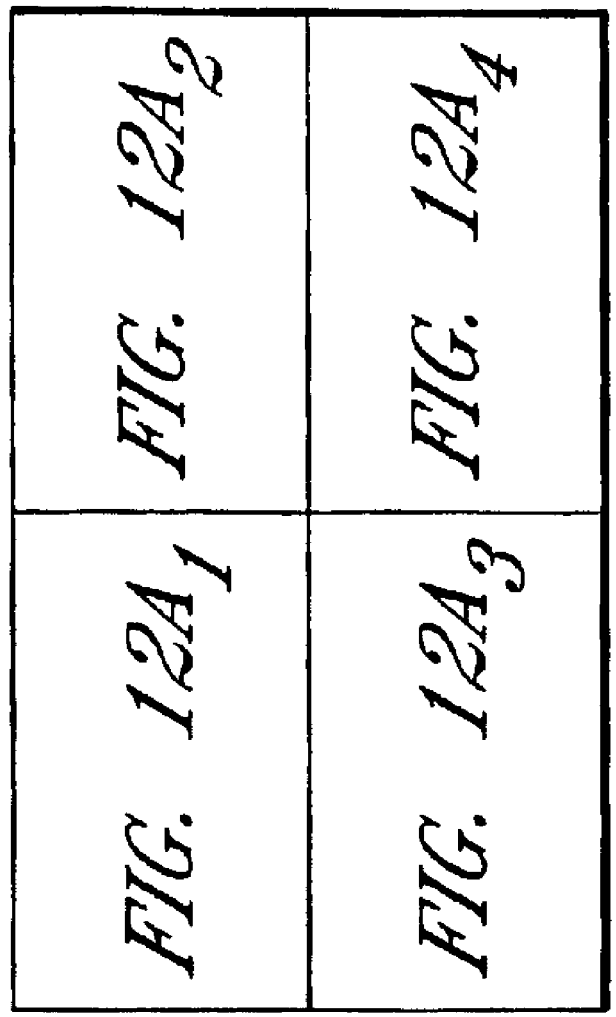
FIG. 12A (consisting of FIGS. 12A1–12A4) illustrates an embodiment of the channel pulse generator and a two-capacitor triangle wave generator for the auto-interleaved synchronizing module of FIG. 8.

FIG. 12A (consisting of FIGS. 12A1–12A4) illustrates an alternative embodiment of the channel pulse generator of FIG. 9A for the auto-interleaved synchronizing module of FIG. 8. FIG. 12A is similar to FIG. 9A, and like elements are numbered alike. In FIG. 12A, the single-capacitor triangle wave generator 901 of FIG. 9A is replaced with a two-capacitor triangle wave generator 1201, and a sample and hold circuit 1202 has two inputs. In particular, the triangle wave generator 1201 uses two capacitors 1250, 1251 in a double-buffer type of arrangement. Each capacitor is connected as a respective input to the sample and hold circuit 1202. Timing accuracy is affected if the timing capacitor is not reset to its starting reference voltage. In the single-capacitor system of FIG. 9A, the reset time is dead time. In the two-capacitor triangle wave generator 1201, one capacitor can be reset to its starting reference voltage while the other capacitor is generating the timing ramp, thereby reducing or eliminating dead time. A flip-flop 1252 toggles between states on each reset pulse to alternately select either the capacitor 1250 or the capacitor 1251 to be connected to the two current sources and to alternatively select the voltage on one of the two capacitors to be sampled and held by the sample and hold circuit 1202.

Although described above in connection with particular embodiments of the present invention, it should be understood that the descriptions of the embodiments are illustrative of the invention and are not intended to be limiting. Various modifications and applications may occur to those skilled in the art without departing from the true spirit and scope of the invention.

What is claimed is:

1. A power supply system comprising:
   a first single-phase synchronizing converter that produces output power having a first phase, the first single-phase synchronizing converter configured to automatically synchronize with at least one other power converter to produce phase symmetry between the first phase and one or more phases of the at least one other power converter; and
   a common phase control bus, wherein the first single-phase synchronizing converter provides a channel pulse to the common phase control bus.

2. A power supply system further comprising:
   a first single-phase synchronizing converter that produces output power having a first phase, the first single-phase synchronizing converter configured to automatically synchronize with at least one other power converter to produce phase symmetry between the first phase and one or more phases of the at least one other power converter; and
   a common phase control bus, wherein the first single-phase synchronizing converter provides a pulse to the common phase control bus, the pulse indicating a phase of the single-phase synchronizing converter.

3. The power supply system of claim 2, wherein the single-phase synchronizing converter uses a tn-state driver to provide the pulse to the common phase control bus.

4. The power supply system of claim 2, wherein the common phase control bus carries time and amplitude information.

5. A power supply system of comprising:
   a first single-phase synchronizing converter that produces output power having a first phase, the first single-phase synchronizing converter configured to automatically synchronize with at least one other power converter to produce phase symmetry between the first phase and one or more phases of the at least one other power converter; and
   a sync bus, wherein the single-phase synchronizing converter provides a sync pulse to the sync bus to indicate a start of a cycle of the power supply system.

6. A power supply system further comprising:
a first single-phase synchronizing converter that produces output power having a first phase, the first single-phase synchronizing converter configured to automatically synchronize with at least one other power converter to produce phase symmetry between the first phase and one or more phases of the at least one other power converter; and
a loadshare bus, wherein the first single-phase synchronizing converter provides a signal to the loadshare bus to indicate an amount of current the first single-phase synchronizing converter is supplying to a load connected to the power supply system.

7. A power supply system comprising a first single-phase synchronizing converter that produces output power having a first phase, the first single-phase synchronizing converter configured to automatically synchronize on a peer-to-peer basis with at least one other single-phase power converter to produce phase symmetry between the first phase at least one phase of the at least one other single-phase power converter to produce a multi-phase converter.

8. The power supply system of claim 7, wherein the first single-phase synchronizing converter is provided to a sync line and to a common phase control line.

9. The power supply system of claim 7, wherein the single-phase synchronizing converter comprises a feedback loop to control the first phase by adjusting the first phase to fall between a previous power pulse produced by a first peer of the single-phase synchronizing converter and a subsequent power pulse produced by a second peer of the single-phase synchronizing converter.

10. A method for adjusting a phase of an output power pulse of a power module, comprising controlling the phase by a feedback loop configured to adjust the first phase to fall between a previous power pulse produced by a first peer of the power module and a subsequent power pulse and a subsequent power pulse produced by a at least one other power module.

11. A power supply system comprising:
a first converter that produces output power according to a first phase;
a second converter that produces output power according to a second phase, the first and second converters each configured to automatically synchronize on a peer-to-peer basis to produce phase symmetry between the first phase and the second phase; and
a common phase control bus, wherein the first converter provides a first channel pulse to the common phase control bus, the second converter provides a second channel pulse to the common phase control bus, and the first converter uses a tri-state driver to provide the first channel pulse to the common phase control bus.

12. A power supply system comprising:
a first converter that produces output power according to a first phase;
a second converter that produces output power according to a second phase, the first and second converters each configured to automatically synchronize on a peer-to-peer basis to produce phase symmetry between the first phase and the second phase; and
a sync bus, wherein a faster of the first converter and the second converter provides a sync pulse to the sync bus to indicate a start of a cycle of the power supply system.

13. A power supply system comprising:
a first converter that produces output power according to a first phase;
a second converter that produces output power according to a second phase, the first and second converters each configured to automatically synchronize on a peer-to-peer basis to produce phase symmetry between the first phase and the second phase; and
a loadshare bus, wherein:
the first converter provides a signal to the loadshare bus to indicate an amount of current the first single-phase synchronizing converter is supplying to a load connected to the power supply system; and
the second converter provides a signal to the loadshare bus to indicate an amount of current the second synchronizing converter is supplying to the load.

14. A power supply system comprising:
a first converter that produces output power according to a first phase;
a second converter that produces output power according to a second phase, the first and second converters each configured to automatically synchronize on a peer-to-peer basis to produce phase symmetry between the first phase and the second phase; and
a shutdown bus, wherein the first converter provides a signal to the shutdown bus to shutdown the first converter and the second converter.

15. A power supply system comprising:
a first converter that produces output power according to a first phase; and
a second converter that produces output power according to a second phase, the first and second converters each configured to automatically synchronize on a peer-to-peer basis to produce phase symmetry between the first chase and the second phase, wherein the first converter is configured to start a first timer at the end of a first second-channel pulse produced by the second converter, the first converter farther configured to end the first timer and start a second timer at a start of a first-channel pulse produced by the first converter, the first converter further configured to stop the second timer at a start of a second second-channel pulse produced by the second converter, the first converter configured to adjust a timing of the first-channel pulse to approximately equalize times measured by the first timer and the second timer.

16. A power supply system comprising:
a first converter that produces output power according to a first phase; and
a second converter that produces output power according to a second phase, the first and second converters each configured to automatically synchronize on a peer-to-peer basis to produce phase symmetry between the first phase and the second phase, wherein the first converter produces first channel pulses and the second channel produces second channel pulses, the first channel configured to adjust a phase of the first channel pulses to fall between the second channel pulses.

17. A power supply system comprising:
a first converter that produces output power according to a first phase; and
a second converter that produces output power according to a second phase, the first and second converters each configured to automatically synchronize on a peer-to-peer basis to produce phase symmetry between the first phase and the second phase, wherein the first converter produces first channel pulses and the second channel produces second channel pulses, the first channel configured to adjust a phase of the first channel pulses to fall between the second channel pulses, the second channel configured to adjust a phase of the second channel pulses to fall between the first channel pulses.

18. A power supply system comprising:

a first converter that produces output power according to a first phase; and a second converter that produces output power according to a second phase, the first and second converters each configured to automatically synchronize on a peer-to-peer basis to produce phase symmetry between the first phase and the second phase, wherein the first converter produces first channel pulses and the second channel produces second channel pulses, the first channel configured to adjust a phase of the first channel pulses to produce phase symmetry with respect to the second channel pulses.

19. A method of auto-interleaving each channel in a multiphase switching converter, the method comprising:

starting a first timer in a first channel;

resetting the first timer if a second channel outputs a second-channel pulse;

stopping the first timer and starting a second timer when the first channel generates a first-channel pulse;

stopping the second timer when a third channel outputs a third-channel pulse;

adjusting a time of the first-channel pulse to cause the first-channel pulse to start approximately halfway between an end of the second-channel pulse and a start of the third-channel pulse;

converting voltages at respective input terminals of inductors into sensed voltages, wherein the sensed voltages are proportional to respective duty cycles of respective voltage waveforms across the respective inductors, one of the sensed voltages being a reference sensed voltage, the others of the sensed voltages being slave sensed voltages;

comparing the slave sensed voltages to the reference sensed voltage;

generating respective offset voltages based on respective differences between each of the slave sensed voltages and the reference sensed voltage; and adjusting duty cycles of the voltage waveforms in accordance with respective offset voltages to achieve equal sensed voltages.

20. A multiphase switching converter, comprising:

means for sensing a start of a converter cycle;

means for producing a sync pulse at the start of each converter cycle; and means for adjusting phases to achieve phase symmetry within a converter cycle through peer-to-peer arbitration.

21. A multiphase switching converter, comprising:

means for converting voltage waveforms at respective input terminals of respective inductors into respective sensed voltages;

means for comparing the sensed voltages;

means for adjusting duty cycles of the respective voltage waveforms to achieve equal sensed voltages; and means for adjusting phases of the respective voltage waveforms to produce phase symmetry.

* * * * *

UNITED STATES PATENT AND TRADEMARK OFFICE
CERTIFICATE OF CORRECTION

PATENT NO. : 6,965,219 B2 Page 1 of 1
APPLICATION NO. : 10/424549
DATED : November 15, 2005
INVENTOR(S) : Steven W. Brooks et al.

It is certified that error appears in the above-identified patent and that said Letters Patent is hereby corrected as shown below:

Sheet 28 of 33, Figure 11, delete "CPLL" and insert - - CPCL - -, therefor.

Column 5, Line 36, delete "converter;. and insert - - converter; - -, therefor.

Column 18, Line 38, In claim 2, after "system", delete "further".

Column 18, Line 52, In claim 3, deleteo "tn-state" and insert - - tri-state - -, therefor.

Column 18, Line 57, In claim 5, after "system" delete "of".

Column 19, Line 1, In claim 6, after "system" delete "further".

Column 19, Line 38, In claim 10, after "by" delete "a".

Column 20, Line 33, In claim 15, delete "chase" and insert - - phase - -, therefor.

Column 20, Line 36, In claim 15, delete "farther" and insert - - further - -, therefor.

Signed and Sealed this

Fifth Day of September, 2006

JON W. DUDAS
*Director of the United States Patent and Trademark Office*